(12) United States Patent
Klotz et al.

(10) Patent No.: US 7,340,380 B2
(45) Date of Patent: Mar. 4, 2008

(54) METHOD AND DEVICE FOR THE EXCHANGE AND PROCESSING OF DATA INTO FUSION DATA

(75) Inventors: Albrecht Klotz, Tuebingen (DE); Werner Uhler, Bruchsal (DE); Martin Staempfle, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 201 days.

(21) Appl. No.: 10/484,602

(22) PCT Filed: Jun. 7, 2002

(86) PCT No.: PCT/DE02/01930

§ 371 (c)(1),
(2), (4) Date: Sep. 1, 2004

(87) PCT Pub. No.: WO03/008995

PCT Pub. Date: Jan. 30, 2003

(65) Prior Publication Data

US 2005/0021201 A1  Jan. 27, 2005

(30) Foreign Application Priority Data

Jul. 17, 2001  (DE) .................. 101 33 945

(51) Int. Cl.
*G06F 17/40* (2006.01)
(52) U.S. Cl. ............... 702/189; 702/142; 702/127; 701/35
(58) Field of Classification Search ........... 702/189, 702/182, 116, 81, 94–96, 104, 124, 126, 127, 702/142, 149, 150, 152, 178, 179, 181, 187, 702/190, 197, 198
See application file for complete search history.

(56) References Cited

U.S. PATENT DOCUMENTS

| | | | |
|---|---|---|---|
| 4,860,216 A | | 8/1989 | Linsenmayer ............... 342/159 |
| 5,001,642 A | * | 3/1991 | Botzenhardt et al. ....... 701/115 |
| 5,005,147 A | * | 4/1991 | Krishen et al. ............... 703/13 |
| 5,202,661 A | * | 4/1993 | Everett et al. .............. 340/522 |
| 5,365,236 A | * | 11/1994 | Fagarasan et al. ............ 342/53 |
| 5,661,666 A | | 8/1997 | Pawlak ....................... 702/182 |
| 5,808,916 A | | 9/1998 | Orr et al. ....................... 703/6 |

(Continued)

FOREIGN PATENT DOCUMENTS

DE  35 06 118  8/1996

(Continued)

OTHER PUBLICATIONS

Backes, "Generalized compliant motion with sensor fusion", Jun. 19-22, 1991, IEEE, Fifth International Conference on Advanced Robotics, 1991, vol. 2, pp. 1281-1286.*

(Continued)

*Primary Examiner*—Hal Wachsman
(74) *Attorney, Agent, or Firm*—Kenyon & Kenyon LLP

(57) ABSTRACT

A method and a device for the exchange and the processing in common of object data between sensors and a processing unit, position data and/or speed data and/or additional object attributes (size, identification, markings) of sensor objects and fusion objects being transmitted and processed between or among the various component parts of the device.

14 Claims, 6 Drawing Sheets

U.S. PATENT DOCUMENTS

| | | | |
|---|---|---|---|
| 6,002,358 A | | 12/1999 | Tsang .......................... 342/195 |
| 6,157,894 A | * | 12/2000 | Hess et al. ..................... 702/54 |
| 6,553,336 B1 | * | 4/2003 | Johnson et al. ............. 702/188 |
| 6,580,385 B1 | * | 6/2003 | Winner et al. ................ 342/70 |
| 6,751,553 B2 | * | 6/2004 | Young et al. ................... 702/5 |
| 7,015,789 B1 | * | 3/2006 | Helgeson .................... 340/3.1 |
| 2002/0156564 A1 | * | 10/2002 | Preston et al. ................ 701/70 |
| 2003/0073406 A1 | * | 4/2003 | Benjamin et al. ............. 455/41 |

FOREIGN PATENT DOCUMENTS

| | | |
|---|---|---|
| DE | 197 55 963 | 6/1998 |
| DE | 298 11 174 | 1/1999 |
| DE | 197 34 639 | 2/1999 |
| DE | 100 28 459 | 12/2000 |
| DE | 199 45 250 | 4/2001 |
| DE | 199 50 915 | 5/2001 |
| DE | 100 151 64 | 10/2001 |
| WO | WO 95/07473 | 3/1995 |

OTHER PUBLICATIONS

Singh et al., "Advances in fusion of high resolution underwater optical and acoustic data", May 23-26, 2000, IEEE, Proceedings of the 2000 International Symposium on Underwater Technology, 2000, pp. 206-211.*

Collins, "Single plane model extension using projective transformations and data fusion", Jun. 15-18, 1992, IEEE, 1992 IEEE Computer Society Conference on Computer Vision and Pattern Recognition, 1992, pp. 752-754.*

Alag et al., "A methodology for intelligent sensor validation and fusion used in tracking and avoidance of objects for automated vehicles", Jun. 21-23, 1995, IEEE, Proceedings of the American Control Conference, 1995, vol. 5, pp. 3647-3653.*

Choi et al., "Motor speed estimation by redundant processing", Mar. 18-21, 1996, IEEE, 1996 4th International Workshop on Advanced Motion Control, 1996, vol. 2, pp. 637-640.*

Kleine-Ostmann et al., "A data fusion architecture for enhanced position estimation in wireless networks", Aug. 2001, IEEE, IEEE Communications Letters, vol. 5, issue 8, pp. 343-345.*

Yaakov Bar-Shalo, *Multitarget-Multisensor Tracking*, Artech House, Norwood, MA, 1990, pp. 1-17, no month.

Hallo et al., An Introduction to Multisensor Data Fusion, Proc. IEEE, vol. 85, No. 1, Jan. 1997, pp. 6-23.

Blackman et al., *Design and Analysis of Modern Tracking Systems*, Artech House, Norwood, MA, 1999, pp. 374-377, 1060-1063, and 1074-1075, no month.

Turner et al., *Sensors for Automotive Telematics*, Meas. Sci. Technol., vol. 11, Feb. 2000, pp. 58-79.

* cited by examiner

Fig. 10 ASSOCIATION MATRIX

Fig. 11 MATRIX AFTER FUSION

Fig. 12 MATRIX AFTER MERGER

METHOD AND DEVICE FOR THE EXCHANGE AND PROCESSING OF DATA INTO FUSION DATA

RELATED APPLICATION INFORMATION

The present application is a U.S. national phase patent application of International Patent Application No. PCT/DE02/01930, filed on June 7, 2002, which claims priority to German Patent Application No. 101 33 945.3, which was filed in Germany on July 17, 2001.

BACKGROUND INFORMATION

Current vehicle guidance functions such as ACC (Adaptive Cruise Control) are based on the editing and processing of the data from only one environmental sensor, such as a 77 GHz-FMCW radar. An exchange of information between various environmental sensors and a common processing of sensor data of different origins is not possible. The bidirectional exchange of information between various environmental sensors and a central unit is not known as yet.

SUMMARY OF THE INVENTION

By contrast, the method according to the present invention and the device according to the present invention have the advantage that the power of detection, i.e. the quality of the sensor signals, the detection rate and the response of individual sensors or of sensor clusters is improved, the false alarm rate is reduced and the cases of sensor failure or of sensor blindness are able to be diagnosed more simply and more reliably. For this purpose, from a central processing module, for example, an information platform IP or a sensor data merging unit SDF, object data from the individual sensors are processed and edited in a targeted way, and are distributed to the individual sensors.

According to the present invention, it is of particular advantage that data from the central processing module are distributed back to the individual sensors or to the sensor clusters. This contains, for example, the assignment in time of the data of the fusion objects to the sensor objects, and in reverse, the identification of like objects in the processing module and in the individual sensors as well as a prediction of the object movements. If the information that has flown back to the individual sensors, such as the information that an object threatens to intrude upon the recording range of another sensor, is used by the sensors for preconditioning —for example, for lowering detection thresholds and/or for initializing filter parameters—then, overall, a greater detection performance and detection security, as well as an improved response in object detection is achieved. In response to overlapping the detection ranges of various sensors, use may be made of the different quality of individual, compatible sensor signals, in which, for example, the generally more accurate resolution of the lateral deviation during the object detection of a video sensor for supporting its angular position is used by an object detected by a 77 GHz radar. Furthermore, the higher degree of the networked data exchange may be used to reduce the false alarm rate of the individual sensors and to assist in diagnosing and interpreting sensor failures or sensor blindness.

Furthermore, according to the present invention, it is advantageously possible that data from various environmental sensors, such as radar, lidar and video are processed in common and condensed. This makes possible object information that is more comprehensive, more reliable, more rapid and at an average time qualitatively of greater value, starting from the measured data supplied by the sensors, than would be possible using a single sensor.

In addition, tracking and identifying objects by the different sensing regions of the sensors is continually possible. The edited and condensed data on objects in the vehicle's environment may be made available to driving functions such as vehicle guidance systems or vehicle safety systems.

Particularly advantageous is the use of an algorithmic method which permits assigning actual objects, such as sensor objects, to historical objects, such as fusion objects or so-called "tracks", i.e. histories of measured values. According to the present invention, this assignment is denoted as data association. Additional processing steps of the algorithm according to the present invention include the steps of fusing fusion objects, which in the following is also denoted as merging, and generating new merger objects, particularly for the consideration of object hypotheses. In the method described, these tasks are carried out with great efficiency. For the association, a computing effort is required, for example, that is proportional to the product n*m, n denoting the number of fusion objects and m denoting the number of sensor objects. The computing effort for the merging step is proportional to n*n. Furthermore, according to the present invention, it is of advantage that the method according to the present invention is carried out using a delayed decision logic, which permits, in the case of a conflict, making the decision, as to which measuring object, i.e. sensor object, is allocated to which object hypothesis, final only in following measuring cycles. Because of the processing steps of the method according to the present invention, the aims named above, of a more inclusive, more reliable, quicker and on average time qualitatively higher valued object information, and the tracking and identifying of objects beyond the different sensing regions of the sensors become possible.

BRIEF DESCRIPTION OF THE DRAWINGS

FIG. 10 shows the representation of the data association for the second example.

FIG. 11 shows the representation of the fusion for the second example.

FIG. 12 shows the representation of the merging for the second example.

DETAILED DESCRIPTION

Figure 1:
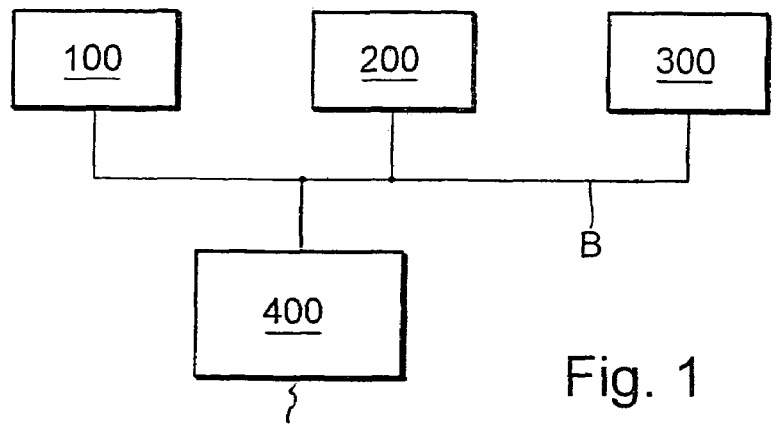
FIG. 1 shows a system for processing sensor data.

FIG. 1 shows a system for processing sensor data. As a rule, the system includes a plurality of sensors, for example, a first sensor 100 shown in FIG. 1, a second sensor 200 and a third sensor 300. Each of the sensors 100, 200, 300 is connected to a bus system, which is marked with reference symbol B. Bus system B is further connected to a processing unit 400. Bus system B is supposed to make sure that the exchange of data between each of sensors 100, 200, 300 and processing unit 400 is ensured, or rather that it is simple and quick to carry out, and that a certain bandwidth for data exchange is available bidirectionally.

According to the present invention, bus system B is particularly provided as a CAN bus (controller area network bus). However, according to the present invention it is also possible to use any other bus architecture.

Processing unit 400, according to the present invention, functions particularly as a sensor data fusion unit 400, or as an information platform 400. In the case of sensors 100, 200, 300, according to the present invention, in particular, single sensors or even whole sensor clusters are involved.

Figure 2:
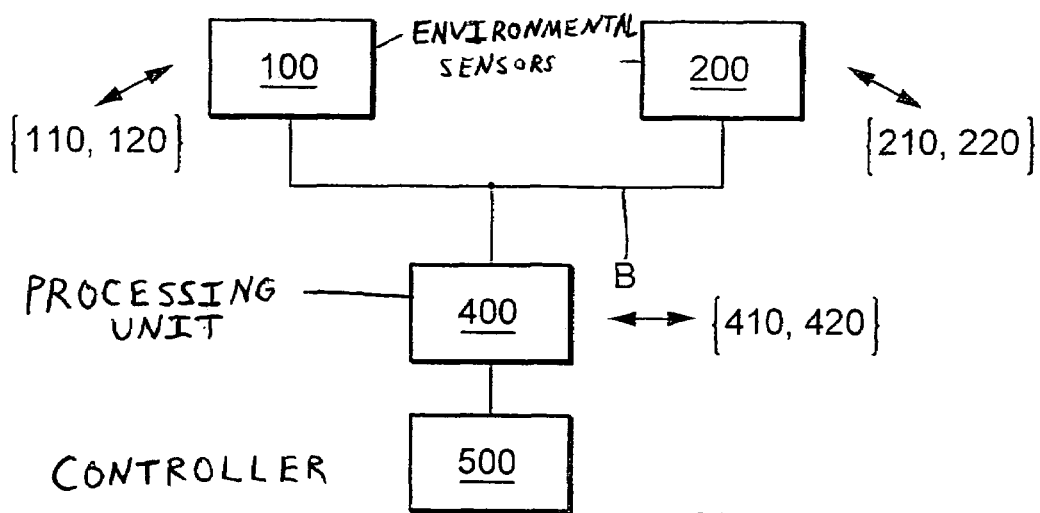
FIG. 2 shows a partial view of the object representation in a system according to the present invention.

FIG. 2 shows a system according to the present invention having, for example, two sensors, namely first sensor 100 and second sensor 200 and having processing unit 400 and bus B connecting these units.

The system according to the present invention and the device according to the present invention for carrying out the method according to the present invention is used particularly to be installed in a motor vehicle in order to describe as well as possible the motor vehicle's environment, so that automated driving functions and safety functions are able to be carried out. For this purpose, FIG. 2 shows a first object 10 and a second object 20 in the outer environment of the motor vehicle (not shown), in which first sensor 100 and second sensor 200, and also processing unit 400 and bus system B are built in.

According to the present invention, it is particularly provided that, as sensors, video sensors, radar sensors—such as 77GHz long-range sensors, 77 GHz medium-range sensors, 24GHz short-range sensors—lidar sensors, laser sensors or ultrasound sensors come into use. In each case there is an interaction between sensors 100, 200, 300 and objects 10, 20. In the case of video sensors the interaction is, for example, that-such that a video sensor records the optical image of the vehicle's environment and analyses it in such a way that objects 10, 20 are recognizable in the environment of the motor vehicle. In the case of radar sensors, according to the present invention, the situation is that the radar sensor emits a radar wave and senses the reflected wave, reflected by the environment, and from that, objects 10, 20 are recognizable. Furthermore, it is provided by the present invention that ultrasound sensors, for example, may be used as the sensors 100, 200. The various linkings-up of sensors 100, 200 with the environment of the vehicle are shown in FIG. 2 in the light of the arrows provided with reference numerals 30 and 31, the arrows provided with reference numeral 30 pointing from first sensor 100 to first object 10 and back, and to second object 20 and back, and arrows 31 pointing from second sensor 200 also to first object 10 and back and to second object 20 and back. This is intended to illustrate that the first and the second object 10, 20 are within the recording range of each of first sensor 100 and second sensor 200.

According to the present invention it is provided that in sensors 100, 200 already a certain preprocessing is carried out of the data stream which corresponds to the continuous or pulsed measurement or sensing of the vehicle environment. As a rule, this is technically required, because thereby data reduction is made possible, and consequently transmission bandwidth on bus system B may be saved. The preprocessing in sensors 100, 200, according to the present invention, particularly consists in producing so-called data objects by sensors 100, 200, starting from objects 10, 20 in the real physical environment of the vehicle equipped with the system according to the present invention. In FIG. 2, for example, on the left, next to the box representing first sensor 100, a curved bracket is shown, which encloses reference numerals 110 and 120. In this context, reference numerals 110, 120 stand for such of the data objects, generated by first sensor 100, as were produced, starting from the objects, for example first object 10 and second object 20, in the real environment of the vehicle. Such data objects, which are produced by one of sensors 100, 200, should be regarded as a set of data which belong to the representation of a real object that exists in the environment of the vehicle—or even just an object that was detected in error by the sensor, but is not present. Since sensors 100, 200 generate such data objects and pass them on to processing unit 400, the data objects produced by sensors 100, 200, 300, are also called sensor objects to make it simple. To generalize, in the following, sensor objects are also called sensor data. Therefore, in FIG. 2, a first sensor object 110 and a second sensor object 120 are shown, by a two-sided arrow head next to first sensor 100, enclosed in the curved brackets already mentioned. Similarly, within another curved bracket, next to second sensor 200, a third sensor object 210 and a fourth sensor object 220 are shown. First and second sensor object 110, 120 was produced in the example by first sensor 100, and third and fourth sensor objects 210, 220 were produced in the example by second sensor 200. Sensor objects 110, 120; 210, 220 may also include parts of real objects (e.g. in the case of the video sensor, edges or parts of object outlines).

The data on sensor objects 110, 120, 210, 220 are passed on via bus system B to processing unit 400, in the sequence of processing of the data measured by sensors 100, 200. Processing unit 400 performs a further data reduction and, in a similar manner to that of sensors 100, 200, also generates so-called data objects, which, however, to differentiate them from the sensor objects, from here on are called fusion objects or, also in a generalizing manner, fusion data. In a similar manner as with sensors 100, 200, in FIG. 2, next to processing unit 400 there is shown a curved bracket enclosing a first fusion object 410 and a second fusion object 420.

Figure 3:
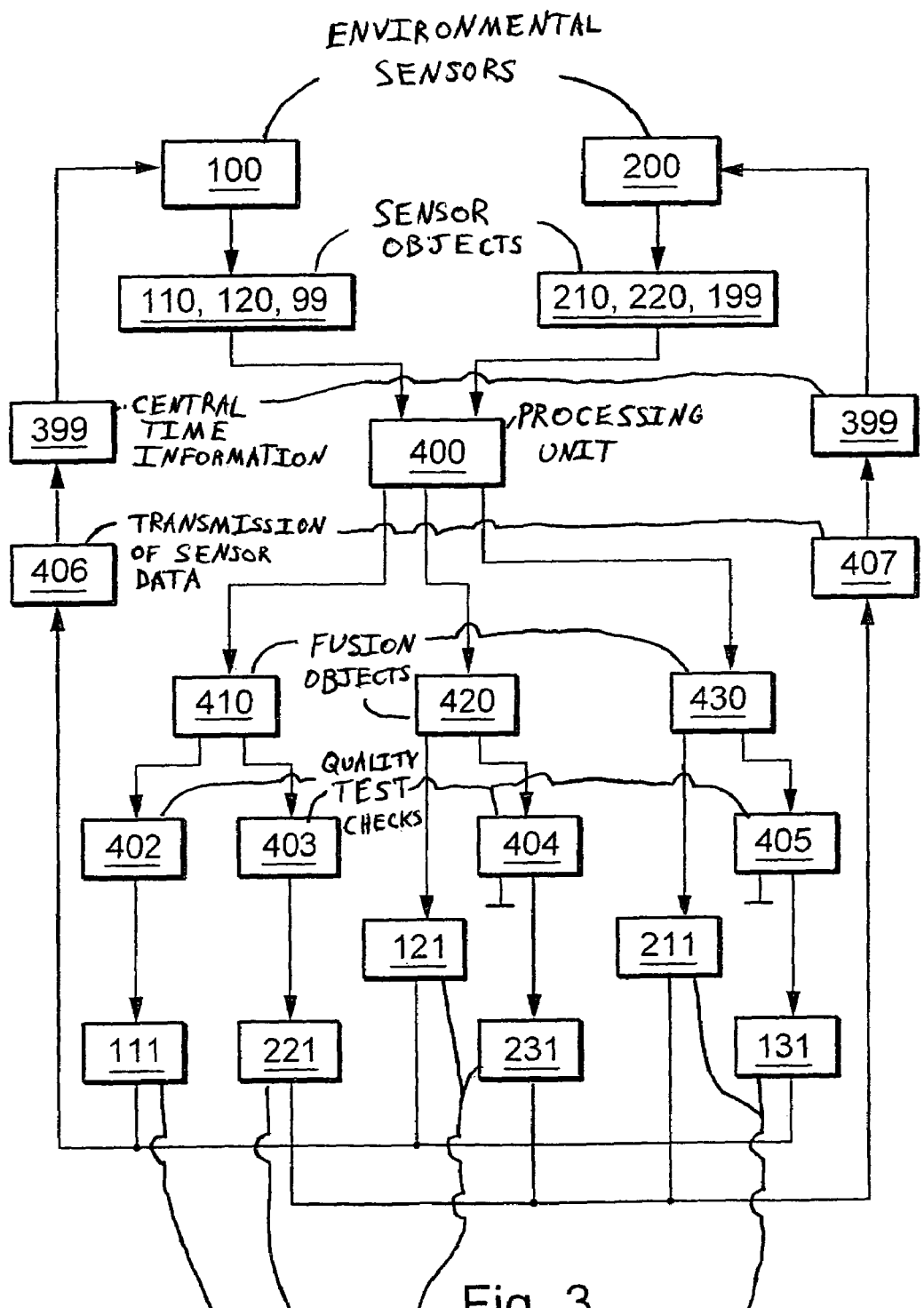
FIG. 3 shows a flow diagram for the data exchange between a processing unit according to the present invention and sensors according to the present invention.

In FIG. 2 there is also shown a controller 500 which is connected to processing unit 400. According to the present invention, it makes no difference whether controller 500 is connected directly to processing unit 400 or whether controller 500 is connected to processing unit 400 via bus system B. In FIG. 3, for example, the first of these two alternatives is shown.

The concept formation for the concept "fusion object" is derived especially from the synonymous designation of processing unit 400 as sensor data fusion unit SDF 400. This comes from the fact that the sensor objects supplied by sensors 100, 200 are "merged" in processing unit 400.

FIG. 3 shows a flow diagram for the data exchange between the sensor data merging or processing unit 400 and a sensor system shown for example, made up of a first sensor 100 as FMCW radar and a second sensor 200 as video sensor. The flow diagram in FIG. 3 represents a repeating flow of environment detection by sensors 100, 200. The state is shown after a possibly provided initialization, i.e. the "steady" state is shown. Therefore, the explanation of FIG. 3 begins arbitrarily at one place on the control loop.

First sensor 100 in the example is provided as a radar sensor, and supplies to processing unit 400 a first sensor object 110 and a second sensor object 120. This is shown in FIG. 3 in such a way that an arrow pointing from first sensor 100 to processing unit 400 includes a box having (among other things) the inscription 110 and 120. Furthermore, first sensor 100 transmits to processing unit 400 a first time information, which is given reference numeral 99. Since first time information is also transmitted to processing unit 400, reference numeral 99 is also in the box included in the arrow between first sensor 100 and processing unit 400. In a corresponding manner, second sensor 200, which in the example is designed as a video sensor, transmits a third sensor object 210 and a fourth sensor object 220 together with a second time information 199 to processing unit 400. This is shown analogously to the arrow between first sensor 100 and processing unit 400 by an arrow between second sensor 200 and processing unit 400, which includes a box marked with reference numerals 210, 220 and 199.

First time information 99 and second time information 199, according to the present invention, are especially provided as time stamps which are produced by sensors 100, 200 and are transmitted to processing unit 400. According to the present invention, it is, provided for a first variant that such time stamps are generated either by sensors 100, 200 in an "absolute manner" so that they do not refer to one reference point. However, according to the present invention, it is also provided for a second variant of the present invention, that processing unit 400, at regular or irregular time intervals, should send a "central time information" to sensors 100, 200, so that first and second time informations 99, 199 are to be understood as "relative time value" with respect to the central time information of processing unit 400. The central time information from processing unit 400 to sensors 100, 200 are shown in FIG. 3 as boxes having reference numerals 399.

Starting from sensor objects 110, 120, 210, 220, the fusion objects are produced in processing unit 400. For this, FIG. 3 shows, for example, a first fusion object 410, a second fusion object 420 and a third fusion object 430. Processing unit 400 has available to it resources for administering a plurality of fusion objects 410, 420, 430. One essential aspect of a fusion object 410, 420, 430 is a list, or rather a quantity, which is the list, or rather the quantity, of the sensor objects which are contained in the fusion object, or which are assigned to the fusion object. This should be understood to mean that one and the same object 10, 20 existing in the vehicle environment—say, first object 10—according to the present invention, is recorded, for example, by several sensors 100, 200, 300. According to the present invention, sensors 100, 200, 300 recording object 10 would each transmit a sensor object to processing unit 400, which is assigned to first object 10 or rather, represents it. Now, in processing unit 400, to form a fusion object to first object 10, these data supplied by various sensors, i.e. sensor objects, with respect to first object 10, would be combined to the just mentioned list of sensor objects that are combined in a fusion object.

Thus, first fusion object 410 includes, for example, first sensor object 110 and fourth sensor object 220, i.e. first sensor object 110 recorded by radar sensor 100, because of its coordinates and its speed corresponds to fourth sensor object 220 recorded by the video sensor, and is therefore combined in processing unit 400 to form first fusion object 410.

In the example, second fusion object 420 includes only second sensor object 120 and third fusion object 430 includes, in the example, third sensor object 210.

Starting from this configuration, the various features, according to the present invention, of the exchange of data between sensors 100, 200, 300 and processing unit 400 are explained in greater detail, in the light of the example shown in FIG. 3.

Fusion objects 410, 420, 430 include so-called attributes, the attributes of fusion objects 410, 420,430 including, among other things, the physical properties and the appertaining quality measurements of the merged object data, as well as a time stamp, which allocates the data and the attributes to a fusion pulse. In this connection, the clock pulse provided in processing unit 400 for keeping the data consistent and bringing them up to date, corresponds to a fusion pulse. A further group of attributes of fusion objects 410, 420, 430 describes the assignment of the sensor objects to the merging objects, for instance, via a sensor object identification (such as a number or a name) and a relative time stamp which contains the point in time of the original measurement relative to the central time stamp or the central time data 399 from processing unit 400. According to the present invention, it is particularly provided that time data 99, 199 and central time information 399 are exchanged in each measuring cycle and fusion cycle or also fusion pulse independently of whether object data, i.e. data which relate to a sensor object or a fusion object are also connected to time data 99, 199 and central time data 399. In this way, a best possible synchronization between processing unit 400 and single sensors 100, 200, 300 to the sensor data fusion pulse is ensured. The inaccuracies are in the area of the transmission times of bus system B and the waiting times during the processing of the data.

In processing unit 400 it is now decided, starting from the contents of fusion objects 410, 420, 430, which information and data flow back to which sensor 100, 200, 300. The basis for this comes, on the one hand, from a priori knowledge, for example, concerning the quality of the respective sensor data and the sensing range of the sensors, and on the other hand the quality information which refers to a measurement in a sensor 100, 200 and is transmitted to processing unit 400 by the sensor using the data set of the sensor object. Furthermore, the history of the fusion object data is a decision basis for which information and data flow back to which sensor 100, 200, 300. The consideration of the signal qualities presupposes the compatibility of the data and the transformation to a uniform coordinate system.

In the example in FIG. 3, according to the present invention, it is the case that the data of first sensor object 110 and the data of fourth sensor object 220 are present in first fusion object 410. Therefore, it is provided in such a situation, according to the present invention, that a quality check be carried out by processing unit 400. This is shown in F*igure* 3 by boxes labeled with reference numerals 402 and 403, to which arrows point that start in each case from the box marked by reference numeral 410. In the quality check having reference numeral 402 it is determined, for example, that the y coordinate of the real object present in the vehicle environment, which is represented by first fusion object 410, is measured better by the second sensor, i.e. a video sensor than by the first sensor, i.e. the radar sensor. From there, the value of the y coordinate of first fusion object 410, measured by second sensor 200, is passed on to first sensor 100 in order to move first sensor 100 to a more accurate, or in general, an additional measurement of the y coordinate of its first sensor object 110 allocated to first fusion object 410. In order for first sensor 100 to be able to recognize to which sensor object the information, sent by processing unit 400, about the y component refers, according to the present invention, in addition to the value of the y component the identification of the respective sensor object is also transmitted by the processing unit, i.e. in the case of the example observed, of first sensor object 110. In a similar manner, after the quality check or check test represented reference numeral 403, the speed component in the x direction is passed on to second sensor 200, i.e. the video sensor, because the value of the speed component in the x direction, which is supplied by the radar sensor, i.e. first sensor 100, as a rule (a priori knowledge) is better than the value of the x component of the speed, which is measured by second sensor 200, i.e. the video sensor. The transmission of the x component of the speed to second sensor 200, in turn, is carried out together with the transmission of an identification for the respective sensor object, i.e. in the case of the present example, for fourth sensor object 220. In FIG. 3, reference numeral 111 stands for the identification of first sensor object 110, reference numeral 221 stands for the identification of fourth sensor object 220, and the arrow starting from quality check test 402 via the box having reference numeral 111 to the box having reference numeral 406 is used to show the transmission of identification 111 of first sensor object 110 to first sensor 100. Likewise, the arrow that starts from the quality check test in the box having reference numeral 403 to the box having reference numeral 407 via the box having reference numeral 221, i.e. which bears the identification for fourth sensor object 220, is used to show the transmission of identification 221 for fourth sensor object 220 to second sensor 200. The transmission of the value of the y coordinate, discussed before, to first sensor 100 was not separately shown in FIG. 3, but should be understood as transmission together with identification 111 of first sensor object 111. Correspondingly, the transmission of the x component of the speed is to be understood together with the transmission of identification 221 of fourth sensor object 220.

Second fusion object 420 includes only second sensor object 120. Therefore, identification 121 of second sensor object 120 is returned to first sensor 100, which is shown by an arrow from the box having reference numeral 420 to the box furnished with reference numeral 406, which includes a box having reference numeral 121 for the identification of second sensor object 120. Starting from the assignment of second sensor object 120 to second fusion object 420, it is further determined in a method step, which is shown by a box marked with reference numeral 404, whether second fusion object 420 penetrates the recording range of second sensor 200, or threatens to penetrate it or not. For these two alternatives, the box having reference numeral 404 in FIG. 3 has a first output which is symbolized by an arrow which ends with a cross line in order to symbolize that processing can break off at this point. Processing breaks off when it is determined that second fusion object 420 does not penetrate the recording range of second sensor 200. If, on the other hand, that is the case, (i.e. second fusion object 420 penetrates the recording range of second sensor 200 or threatens to penetrate it), an identification is sent to second sensor 200 for a further sensor object that is to be generated. This identification for a further sensor object, which is not yet included in the sensor object list that is sent by second sensor 200 to the processing unit, is shown in FIG. 3 having reference numeral 231. Together with identification 231 for a further sensor object, which is also designated below as a (not shown) fifth sensor object, the coordinate data appertaining to second fusion object 420 are sent to second sensor 200. These coordinate data include particularly the x and the y component of the distance and the x and the y component of second fusion object 420.

In a similar way, starting from third fusion object 430, identification 211 for third sensor object 210 is sent to second sensor 200, and in a function block 405 the decision is made whether third sensor object 210, or third fusion object 430 will penetrate the recording range of first sensor 100 or not. Analogously to second fusion object 420, therefore, in the case of penetration of the recording range of first sensor 100, an identification 131 for a (not shown) sixth sensor object is sent to first sensor 100 together with the coordinate data of the sixth sensor object.

The data exchange between 100, 200, 300 and processing unit 400 takes place basically according to the following criteria:

A recovery of objects in the sensor is carried out, which takes place by the exchange of identifications 111, 221, 121, 211 of sensor objects—these identifications are also known as tracking numbers—when no overlapping of sensor ranges takes place.

An improvement of the accuracy of recording the vehicle's environment is brought about by the fact that the single signals which were identified as appertaining to an object, and which have a higher quality than the source data, are purposefully sent back to the sensor, which has also identified this object, for use internally to the sensor. For this, a quality check or a quality check test is carried out, compare the description of the boxes in FIG. 3 furnished with reference numerals 402 and 403.

According to the present invention, in addition, an improvement of the response behavior of sensors is brought about by object data being passed on to a sensor—such as first sensor 100—which does not yet detect an object—such as first object 10—when first object 10 has been detected by another sensor—such as second sensor 200—and the predicted movement of first object 10 makes obvious an already present, or a soon to be present penetration of first object 10 into the recording range of first sensor 100. First sensor 100 can then more quickly recognize first object 10 which is penetrating its recording range, and can initialize internal parameters, such as the filter settings, in a well directed manner. This is denoted as the preconditioning of first sensor 100. This is shown in FIG. 3 for second and third fusion objects 420, 430 by the decision finding in the boxes designated by reference numerals 404 and 405.

Also, according to the present invention, an increase in detection performance is brought about in that objects, which lie in common recording ranges of several sensors, and are not detected by all the sensors, are announced to those sensors which do not detect these objects. This is done with the aim of influencing and controlling the attentiveness of such a sensor that does not detect the object in a purposeful manner (attentiveness control), for example by lowering threshold values, by refining the discretization, etc. This can increase the detecting performance of the single sensors.

Furthermore, according to the present invention, it is provided that the method according to the present invention for the exchange of data between sensors 100, 200, 300 and processing unit 400 be drawn upon for the recognition of false alarms, sensor failures and/or vignetting (shading). Objects which lie in the common recording range of several sensors and were not detected by all the sensors are reported to those sensors which do not detect them. If a sensor still cannot detect the object, this information should be purposefully investigated for the possibility of a faulty detection by the other sensors (false alarm), of a sensor failure or of vignetting of the sensor.

The data to be transmitted from central station [sic] 400 to the sensors may particularly, according to the present invention, be furnished with a prioritization, so that, in response to a limitation of the bandwidth which can be transmitted via bus system B, the data volume is reduced in such a way that only the highest prioritized data to be transmitted by processing unit 400 to sensors 100, 200, 300 are transmitted via bus system B. Therefore, it is provided in FIG. 3 to furnish the data flowing to sensors 100, 200 with a prioritization unit which, with respect to the data to be transmitted to first sensor 100, is marked by reference numeral 406, and with respect to the data to be transmitted to second sensor 200, is marked by reference numeral 407.

Figure 4:
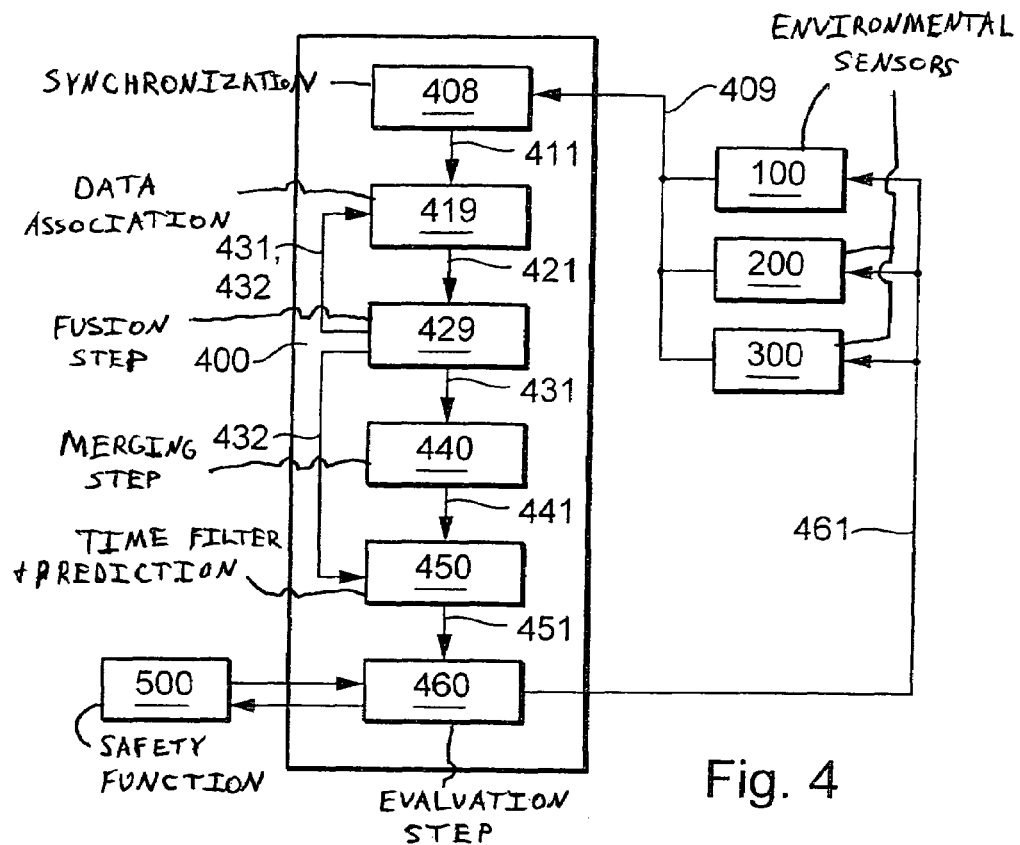
FIG. 4 shows a structogram of the processing algorithm according to the present invention.

FIG. 4 shows a structogram of the evaluation algorithm of sensor objects. According to the present invention, the algorithm is executed particularly in processing unit 400. However, according to the present invention, it is also provided that various processing steps of the evaluation algorithm shall be carried out in distributed systems. FIG. 4 also shows sensors 100, 200, 300. Sensors 100, 200, 300 supply first data, which are shown in FIG. 4 by an arrow having reference numeral 409, to processing unit 400. First data 409 are synchronized in first processing step 408. In first processing step 408 a synchronization is carried out of first data 409 to a base pulse of processing unit 400. The details of this synchronization step are shown, in particular, in the German Patent-Application DE20011033962 by the same applicant, bearing the title "Method for the temporal synchronization of a plurality of vehicle sensors". Starting from first data 409 which are especially present as sensor objects 110, 120, 210, 220, first processing step 408, i.e. the synchronization, supplies second data 411 that are synchronized in time. This is shown by an arrow, starting from first processing step 408, which is marked by reference numeral 411. According to the present invention, data of various environmental sensors 100, 200, 300—particularly in the processing unit—are first of all transformed to a uniform coordinate system in first processing step 408 (data alignment) and are synchronized in time. A current sensor object list having measuring objects is set up for each sensor.

Second data 411 are sent to a second processing step 419, or rather, are made available to it. Second processing step 419 is also designated below as association step 419. At second processing step 419, the so-called data association is carried out, i.e. it is attempted to assign the measuring objects to one or more existing fusion objects. If no assignment takes place, a new fusion object is generated. The result of the assignment or association may, for example, be retained in an association matrix 422 (described further below), in which all possible object hypotheses (assignment of measured to present objects or object hypotheses) are registered. For each sensor type, or for each sensor there exists a column in association matrix 422. At second processing step 419, third data 421 are produced which are made available to a third processing step 429. Third processing step 429 is also designated below as association step 429. Third data 421 include particularly the so-called association matrix 422. In third processing step 429, in which the so-called fusion is carried out, fourth data 431 and fifth data 432 are generated. During the fusion, i.e. third processing step 429, the association matrix is processed line by line, and new fusion objects or fusion data are formed by forming weighted mean values of the relevant object attributes. Objects or object hypotheses which over a certain time span are no longer able to be measured by any sensor, are discarded. Fourth data 431 include particularly a so-called fusion object list 431, and are made available to second processing step 419. Fifth data 432, also produced by third processing step 429, i.e. by data fusion 429, which especially include so-called tracking data 432, are made available both to second processing step 419 and a fifth processing step 450. Fourth data 431, i.e. fusion object list 431, starting from third processing step 429, is also made available to a fourth processing step 440, a so-called merging processing step 440, which is also denoted as merging step 440 below. At fourth processing step 440, the newly calculated fusion objects, which lie within a capture range (shown first in FIG. 5), are fused to an object. This is done on the basis of a gating method, similarly to what was done in the association. Fourth processing step 440 produces sixth data 441 which are made available to fifth processing step 450, fifth processing step 450 carrying out a filtering in time of the object data, such as using a lowpass filter or Kalman filter, a smoothing in the time dimension being carried out. Furthermore, at fifth processing step 450, a prediction of an additional time step is undertaken. Sixth data 441 include particularly a so-called condensed fusion object list. At fifth processing step 450, i.e. filtering 450, seventh data 451 are generated, which are made available to a sixth processing step 460. Sixth processing step 460 is also designated below as evaluation step 460. Seventh data 451 include particularly a filtered and predicted fusion object list. At sixth processing step 460, plausibilization of the objects and an object selection is carried out. The plausibilization is provided, according to the present invention, to be especially specific as to function. Moreover, at sixth processing step 460, eighth data 461 are generated or selected to be passed on to sensors 100, 200, 300. Eighth data 461 are also denoted below as acknowledgment data 461. Furthermore, according to the present invention, an optional data exchange takes place at sixth processing step 460 having at least one postconnected information function, convenience function or safety function 500, which uses the environment data as input variables. This postconnected function corresponds to controller 500, or rather, is located in controller 500. According to the present invention, in one particularly advantageous specific embodiment, it is especially provided that a prioritization of the fusion objects be carried out at sixth processing step 460, as is described subsequently.

Figure 5:
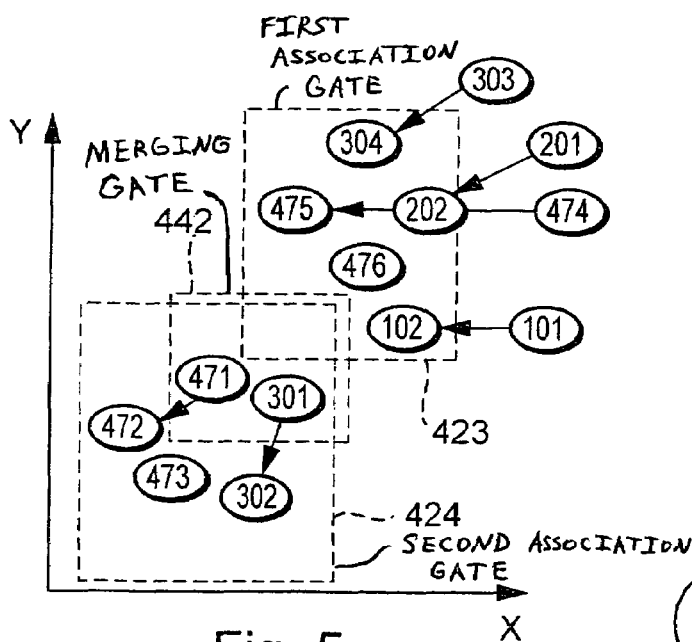
FIG. 5 shows a first example of a measuring situation.

FIG. 5 shows a first example of a measuring situation. A coordinate system having an x axis and a y axis is shown, which represents a coordinate system of the vehicle's environment that is in common to several sensors. In this connection, the x coordinate and the y coordinate represents, for instance, place coordinates or angular coordinates or speed coordinates.

First sensor 100 "sees" an object—such as first object 10—at a first time step (not shown) at a first position marked by reference numeral 101. The object detected in first time step by first sensor 100 at 101 is expected (prediction) in a subsequent second time step (also not shown) at a position designated by reference numeral 102. In the same way, an object is detected by second sensor 200 in the first time step at position 201 denoted by reference numeral 201, and is expected in the second time step at the position designated by reference numeral 202. Third sensor 300 detects two objects: one object is detected at the first point in time at the position denoted by reference numeral 301 and expected at the second point in time at the position denoted by reference numeral 302, and a further object is detected at the first point in time at the position denoted by reference numeral 303 and is expected at the second point in time at the position denoted by reference numeral 304.

Starting from the data transmitted to processing unit 400 by sensors 100, 200, 300—with the aid of sensor objects 110, 120, 210, 220—the fusion objects are defined by association of sensor objects, starting from the predicted data for the positions (102, 202, 302, 304) of the measured objects of the individual sensors. In doing this, so-called association gates are used. FIG. 5 shows a first association gate, having reference numeral 423, and a second association gate, having reference numeral 424.

Figure 6:
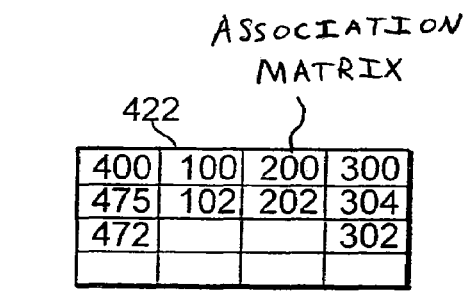
FIG. 6 shows the representation of the data association for the first example.
Figure 7:
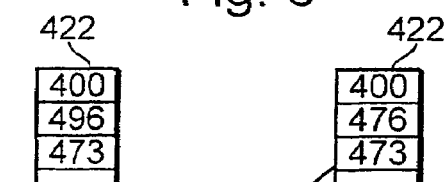
FIG. 7 shows the representation of the fusion for the first example.
Figure 8:
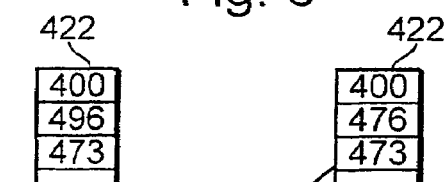
FIG. 8 shows the representation of the merging for the first example.

FIG. 6 shows the association matrix for the first example, FIG. 7 shows the matrix after fusion for the first example, and FIG. 8 shows the matrix after merging for the first example. Since the expected positions for the second time step furnished with reference numerals 102, 202 and 304 lie within first association gate 423, their evaluation leads to the hypothesis that only a single object was detected by different sensors (because of measuring errors) at (slightly) different positions. Therefore, the positions provided with reference numerals 102, 202, 304 or the corresponding sensor objects are assigned to a fusion object which, at the first time step, was measured at the position denoted by reference numeral 474, for which, at the second time step, the position denoted by reference numeral 475 is expected (prediction) and for which, at the second time step, the position denoted by reference numeral 476 is "measured" or calculated. Therefore, in FIG. 6, which shows association matrix 422 for the first example, a line is provided for the fusion object which, at the second time step is presumed to be in the position denoted by reference numeral 476. Correspondingly, the position provided with reference numeral and the corresponding sensor object are assigned to a fusion object which, at the first time step, was measured at the position denoted by reference numeral 471, for which, at the second time step, the position denoted by reference numeral 472 is expected (prediction) and for which, at the second time step, the position denoted by reference numeral 473 is "measured" or calculated. Therefore, in FIG. 6, a line is provided for the fusion object which, at the second time step is presumed to be in the position denoted by reference numeral 473. According to the present invention, association matrix 422 produces a connection between a fusion object and one or more sensor objects. In FIG. 6, to represent this connection, only the reference numerals are given which correspond to the positions of the corresponding objects. According to the present invention, in practice it is particularly provided that, to produce the connections represented by the association matrix between sensor objects and fusion objects, their identifications be drawn upon. In order to set up association matrix 422, a global, statistical separation distance measurement, such as the Mahalanobis norm, or signal-specific separation distance measurements d between each sensor object and each fusion object is calculated, for example, using the Euclidian separation distance. The separation distance measurements are, as a rule, defined in the phase space, i.e. besides the position data they may also contain speed data. For simplicity's sake, the examples shown in FIG. 5 and FIG. 9 (which is described below) include only position data. A possible assignment (i.e. an object hypothesis) between the sensor object and the fusion object is assumed, provided the separation distance d is less than a threshold value (gate or association gate 423, 424) or may be assigned to the object by a statistical test having a confidence, or rather, all separation distances d are less than the threshold values. In addition, a measure of quality for the quality of the association may be assigned which, for example, states how much less separation distance d is than the threshold value. The threshold values may be different for each signal or for each object. Furthermore, the threshold values may be a function of variables such as measuring errors of the individual measurement and of the fusion object, the distance of the object from one's own vehicle, the relative speed of the objects, or the association with the travel route envelope of one's own vehicle, etc. If an association is found, an entry is made in the association matrix. The lines in the association matrix correspond, for example, to the index of the fusion object in the fusion object list, and the columns correspond, for example, to sensors 100, 200, 300 and the sensor type. An entry in the association matrix consists, for example, of a separation distance d, of a value for the quality of the association, of the object number of the sensor object, of a cross reference to the place where the sensor object is to be found in the sensor-specific object list, and an "assigned" mark. If a position in the association matrix is already assigned, the sensor object is appended to the fusion object list, and the counter for the number of current fusion objects is incremented. The method described deliberately includes a multiple association of sensor objects with existing fusion objects (multi-hypotheses). In order to increase efficiency, fusion object lists and object sensor lists, sorted, (for example, by separation distance), may be used, whose processing at the exceeding of a threshold (for instance, with respect to the separation distance), after which certainly no further association can take place, can be broken off (a kind of "gating"). The same applies to the merging of fusion objects described below.

Example of a development of the data association algorithm:

```
For all sensor objects (SO_k) of a sensor (S_i):
    for all fusion objects (FO_n):
        Calculate separation distance measures between SO_k and FO_n
            if all separation distance measures are less than a threshold,
            (the threshold being a function of the sensor quality, the
            separation distance, the transverse displacement, the speed,
            the travel route envelope):
                match := TRUE
                determine quality of the association
                if cell (n, I) of association matrix is unoccupied:
                    fill this cell with separation distance, sensor object data
                    and mark this cell as "occupied",
                otherwise:
                    n := n+1
                    FO_n includes SO_k
                    Give out new identification for FO_n
                    fill the cell (n, I) of the association matrix with
                    separation distance, sensor object data and mark this
                    cell as "occupied",
            otherwise:
                next fusion object
    end (fusion objects)
    if match = FALSE (i.e. new object, because outside of
    association gate):
        n := n+1
        FO_n includes SO_k
        give out new identification for FO_n
        fill the cell (n, i) of the association matrix with separation
        distance, sensor object data and mark this cell as "occupied"
end (sensor objects)
```

In FIG. 5, besides association gates 423, 424, a merging gate 442 is shown, which is designated below also as capture range 442. In the fusion module, i.e. third processing step 429, new fusion object attributes are calculated for the objects in the fusion list. This occurs by line by line execution of association matrix 422, in which all necessary attributes are present which ensure the weighting of the new fusion objects and access to the original measuring data. If several sensors contribute to a fusion object, a weighting of the individual signals of the sensors is utilized. The weights is determined from the quality of the association and the sensor data quality. If only one sensor contributes to the fusion object, no explicit weighting is performed, but an indirect weighting takes place in the subsequent merging step (i.e. fourth processing step 440) or in the filtering step (i.e. fifth processing step 450). In the fusion module, i.e. the third processing step, a further fusion object attribute, the object plausibility, is determined. The object plausibility is incremented, for example, as soon as a fusion object has been confirmed by at least one sensor object. The increment, in this context, is a function of the number of associated sensor objects as well as of the ratio of the cycle time of the sensor fusion to the cycle time of a sensor pulse (i.e. the relevance to the present of the sensor object data). If a fusion object is not confirmed in the current fusion cycle, the object plausibility is decreased. The increment and the decrement of the object plausibility is also able to be a function of the current value of the object plausibility.

After third processing step 429, i.e. the fusion, the fusion object list is executed once more, in order to find and to fuse objects which lie within a capture range. By doing this, implicitly, assignments of sensor objects of the same sensor type to a fusion object are considered, as well as object hypotheses which, because of the fused data are only slightly different, are combined to a fusion object. The procedure is similar to the one described for the association. It is true that merging gates 442 are generally smaller than association gates 423, 424, and any two objects which lie within a capture range 442 are immediately fusioned or "merged" to a new object. For the merging of the objects, the respective signal quality may be drawn upon for the weighting of the individual signals.

Accordingly, association matrix 422 (diminished by the sensor objects) which is shown in FIG. 7 and FIG. 8, includes the same number of objects, namely two, because the detected objects at the positions denoted by reference numerals 476 and 473 do not approach each other closely enough to fit into a capture range 442. Therefore, a combination of the objects in the fourth processing step 440 did not take place in the first example.

Figure 9:
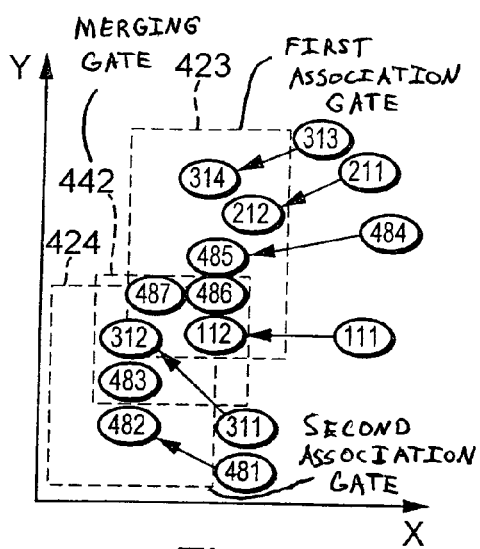
FIG. 9 shows a second example of a measuring situation.

In the second example, shown in FIGS. 9 through 12, the situation looks different. FIG. 9 shows a second example of a measuring situation. A coordinate system having an x axis and a y axis is again shown. Again, the x coordinate and the y coordinate represent, for instance, place coordinates or angular coordinates or speed coordinates.

First sensor 100 "sees" an object—such as first object 10—at a first time step (not shown) at a first position marked by reference numeral 111. The object detected in the first time step by first sensor 100 at 101 is expected (prediction) in a subsequent second time step (also not shown) at a position designated by reference numeral 112. In the same way, an object is detected by second sensor 200 in the first time step at the position designated by reference numeral 211, and is expected in the second time step at the position designated by reference numeral 212. Third sensor 300, in turn, detects two objects: one object is detected at the first point in time at the position denoted by reference numeral 311 and expected at the second point in time at the position denoted by reference numeral 312, and a further object is detected at the first point in time at the position denoted by reference numeral 313 and is expected at the second point in time at the position denoted by reference numeral 314. The first association gate is again denoted by reference numeral 423, and a second association gate by reference numeral 424.

FIG. 10 shows association matrix 422 for the second example, FIG. 11 shows the matrix after fusion for the second example, and FIG. 12 shows the matrix after merging for the second example. Since the expected positions for the second time step furnished with reference numerals 112, 212 and 314 lie within first association gate 423, their evaluation leads to the hypothesis that only a single object (because of measuring errors) was detected by different sensors at (slightly) different positions. Therefore, the positions provided with reference numerals 112, 212, 314 or the corresponding sensor objects are assigned to a fusion object which, at the first time step, was measured at the position denoted by reference numeral 484, for which, at the second time step, the position denoted by reference numeral 485 is expected (prediction) and for which, at the second time step, the position denoted by reference numeral 486 is "measured" or calculated. Therefore, in FIG. 10, which shows association matrix 422 for the second example, a line is provided for the fusion object which, at the second time step, is presumed to be in the position denoted by reference numeral 485. Correspondingly, the position provided with reference numeral 312 and the corresponding sensor object are assigned to a fusion object which, at the first time step, was measured at the position denoted by reference numeral 481, for which, at the second time step, the position denoted by reference numeral 482 is expected (prediction) and for which, at the second time step, the position denoted by reference numeral 483 is "measured" or calculated. Therefore, in FIG. 10, a line is provided for the fusion object which, at the second time step is presumed to be in the position denoted by reference numeral 482. In FIG. 10, again, only those reference numerals are given which correspond to the positions of the corresponding objects, although association matrix 422 includes still further data. In the second example, the situation is that, at association step 419, additional lines (second and third line of the association matrix illustrated in FIG. 10) were fitted in, because it could not be clearly decided whether, in the case of the objects represented by the positions designated by reference numerals 112 and 312, a single object is involved, or two. Because of this it became necessary to fit in a line which is designated by reference numeral 489 in FIG. 10, and thus to generate a "hypothetical" fusion object to represent the additional object hypothesis "two separate objects". FIGS. 11 and 12 show the (again diminished) association matrices after the fusion step or after the merging step. One may recognize that the merging step leads to a combination of the three fusion objects that are still present after the fusion step, because all the positions of the objects at the second time step (positions denoted by reference numerals 486 and 483) lie within merging gates 442 which was also shown in FIG. 10. Thereby these fusion objects are combined to a single fusion object which, at the second point in time, is presumed to be at the position denoted by reference numeral 487.

Figure 13:
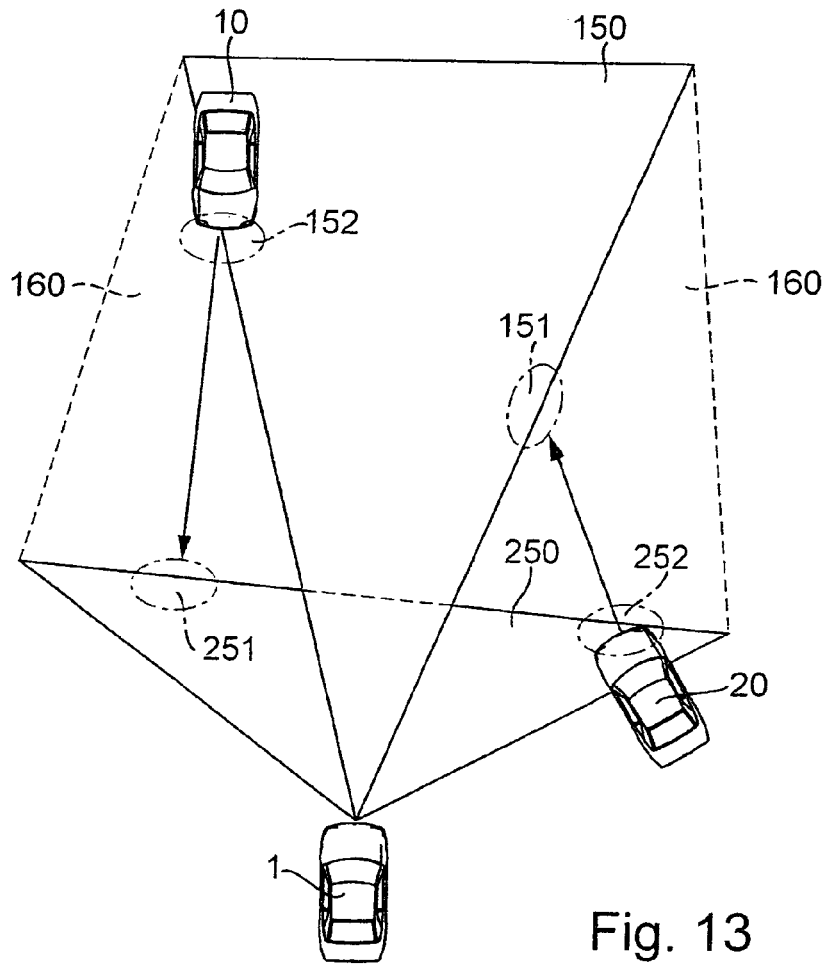
FIG. 13 shows the representation of the bridging of a detection gap between two detection regions.

In FIG. 13 a typical situation is shown which appears when several environmental sensors or sensors have different recording ranges. In FIG. 13, reference numeral 1 designates the device which has various sensors, such as first sensor 100 (not shown in FIG. 13) and second sensor 200 (also not shown in FIG. 13). According to the present invention, device 1 is provided as a motor vehicle 1, which has sensors 100, 200. Starting from vehicle 1, a first recording range 150 of a sensor is shown, for example, of first sensor 100, and a second recording range 250 of a sensor, for example, second sensor 200. Furthermore, in FIG. 13 a first object 10 and a second Object 20 are shown, the objects being particularly additional motor vehicles. Between recording ranges 150, 250, which are henceforth also called detection ranges 150, 250, a detection gap 160 is shown (on both sides), i.e. a range for which neither of sensors 100, 200 would supply a signal, if there were an object 10, 20 in detection gap 160. In FIG. 13, the situation is shown in which first object 10 is in first recording range 150, and is about to leave it, while second object 20 is in second recording range 250 and is also about to leave that. Therefore, in FIG. 13 a first exit region 152 and a second exit region 252 are shown, first exit region 152 representing the location or the region at which first object 10 exits from first detection region 150, and second exit region 252 representing the location or the region at which second object 20 exits from second detection region 252. According to the present invention, objects 10, 20 are represented in processing unit 400 as fusion objects, such as the first and the second fusion object 410, 420. Thus, according to the present invention, it is possible to "bridge" detection gap 160 in such a way that the motions of objects 10, 20 are estimated (predicted) relative to detection ranges 150, 250, and one is consequently also able to estimate, whether, and if yes, when and where one of objects 10, 20, which is just leaving a detection range 150, 250, is again entering (another) detection range 150, 250. Therefore, FIG. 13 shows a first entry region 251, which gives the estimated place where first object 10 enters second detection range 250, and a second entry region 151 which gives the estimated place where second object 20 enters first detection range 150.

According to the present invention, the sensor objects are processed in common by various sensors, in the various processing steps 408 to 460 in processing unit 400 and are administered as merging objects. A data set of a tracked merging object or an object hypothesis is made up, among other things, of the position, the speed, the acceleration as well as an object plausibility. In addition to that, it is assumed that the fusion object has already been followed over any number of detection cycles, and the history of the fusion object, i.e. its "tracking data", is available in parametric, model-supported form, for example, via Kalman filter coefficients. In addition, it is supposed that detection ranges 150, 250 of the single sensors are known and are described in mathematical form. In this context, the edges of detection ranges 150, 250 do not have to have sharp borders, but may be described by tolerance bands. The plausibility is a measure for the reliability of the object hypothesis, a number between zero and one, for example, giving the plausibility, and the value zero for the plausibility corresponding to an improbable (and to be discarded) object hypothesis, and the value one for the plausibility corresponding to a very probable object hypothesis. The plausibility of an object hypothesis, i.e. of a fusion object, is calculated anew by incrementing or decrementing in each cycle of the algorithm. The magnitude of the increment or the decrement is variable, and essentially determines the life cycle of an object hypothesis. The fact that, for example, first object 10 in FIG. 13 leaves first detection range 150, is represented in the merging object representation within processing unit 400 in such a way that, for example, the object motion of first merging object 410 is predicted from its history, i.e. its tracking data, up to the next expected or a later expected measuring value, and the crossing of the borderline of first detection range 150 is determined. If the predetermined position lies outside the range borders of first detection range 150, object 10, or its data representation, will leave first detection range 150 in the form of first merging object 410. The possible reentry into adjacent second detection range 250 is determined in that, starting from calculated first exit region 152, the expected trajectory is predicted so far into the future until entry into second detection range 250 is to be expected. This is defined, for example, by the area of intersection of the expected trajectory with the area border of second detection range 250. Because of the uncertainty of the prediction and the fusion object data it is based on, as well as because of data possibly present concerning object dimensions, a range, and not an exactly defined point is invariably calculated, in which the exit from first detection range 150 (first exit range 152) or the entry into second detection range 250 (first entry range 251) takes place and is expected. If there is no such intersection area, i.e. such entry ranges 251, 151 and exit ranges 152, 252, or if the expected reentry point in time lies outside predetermined time limits (which means that a reentry into another detection range is not to be expected), first object 10 is "deplausibilized" using a standard decrement, i.e. the value of its plausibility is reduced in a predetermined manner. This case is not represented in FIG. 13. In the other case (shown in FIG. 13), the maximum time duration is determined which will probably elapse up to a possible entry into the second detection range, which is done, for example, by division of the longest possible path in detection gap 160 by the relative speed. Starting from the value of the current plausibility, the known cycle time, i.e. the pulse time at which the participating sensors work, and the maximum time duration of object 10 in detection gap 160, the plausibility decrement can be reduced in such a way that the object or the object hypothesis is not discarded as long as it is probably present in detection gap 160. The calculation of the expected entry range and of the plausibility decrement is repeated anew at each repetition of the algorithm, while taking into account the speed and the yawing motion of vehicle 1. If first object 10 is not detected at the previously determined location and at the previously determined time in second detection range 250, the object hypothesis is discarded. If first object 10 is not detected at the previously determined location and at the previously determined time in second detection range 250, it is identified with the old object. This makes possible improved and more rapid signal dynamics of the merging object, particularly in the case of sensors which do not measure speed and acceleration of objects directly, upon reentry into second detection range 250, since no imprecise estimates have to be made for filter initialization, but one can fall back on better, predicted estimated values. That is the case because the signal qualities of merging objects (which also include the information on the history of the object) as a rule are greater than the signal qualities of sensor objects. The postconnected driving function, which, as a rule, is located in controller 500, can utilize the improved signal qualities of the fusion object upon reentry into second detection range 250, in that the reaction is more rapid and more reliable. This raises the data quality, which contributes to an improvement in the robustness and the reliability of the postconnected driving functions. According to the present invention, in one advantageous specific embodiment of the present invention, it is particularly provided (of the explanations of FIG. 3) that, between processing unit 400 and sensors 100, 200, 300 an exchange of object data is provided in such a way that such object data are sent to sensors 100, 200, 300. In this connection, if data on the entry of first object 10 into second detection range 250 are supplied to second sensor 200, this sensor is able to detect the first object more rapidly, more certainly and more accurately. The algorithm described, for bridging detection gaps 160, can also be extended to problems of the following of objects when these are temporarily obstructed.

Figure 14:
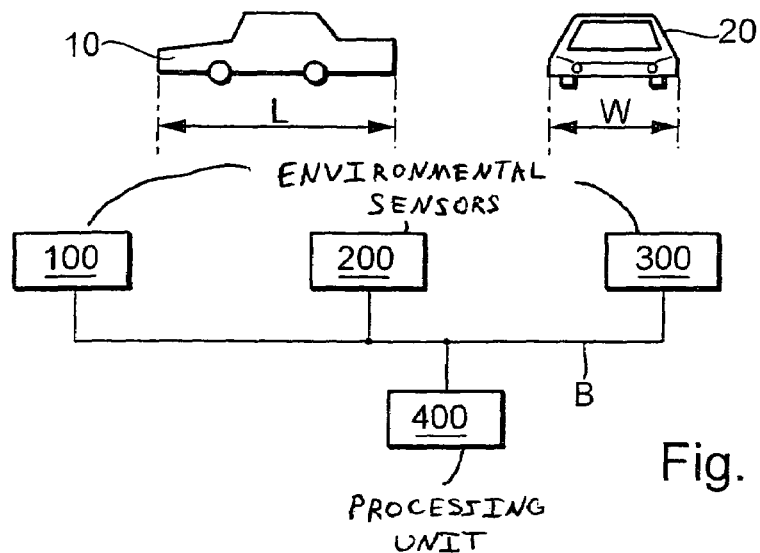
FIG. 14 shows the system for processing sensor data in a transformed representation.

FIG. 14 shows the system for processing sensor data in a transformed representation. The system again includes first sensor 100, second sensor 200 and third sensor 300. Each sensor 100, 200, 300 is connected to bus system B, which is also connected to processing unit 400. In FIG. 14, similarly to the way it was in FIG. 2, first object 10 and second object 20 are also shown in the outer environment of motor vehicle 1 (not shown in FIG. 14), into which first sensor 100, second sensor 200 and third sensor 300, processing unit 400 and bus system B are built in. It is one aspect of the present invention to determine the object size of objects 10, 20. For this purpose, in FIG. 14, as examples of object sizes the length marked "L" is given for first object 10, and the width marked "W" is given for second object 20. Objects 10, 20—and thus also their extensions—are recorded by sensors 100, 200, 300, as was discussed in principle in the case of FIG. 2. Here, in FIG. 14, for the sake of simplicity, the arrows marked with reference numerals 30, 31 have been omitted. In FIG. 14, for the sake of simplicity, sensor objects 110, 120, 210, 220 and fusion objects 410, 420, shown in FIG. 2, have also been omitted. However, in principle the system according to FIG. 14 works in analogous fashion to that in FIG. 2.

One of the aspects of the present invention relates to the measuring of the object size of objects 10, 20. Processing unit 400 processes the various data supplied by sensors 100, 200, 300, object hypotheses as fusion objects being thereby generated. According to the present invention, the entire available sensor information is drawn upon for determining the object size of objects 10, 20. The aim is the spatial and temporal accumulation of potential size information. Object sizes that are ascertained may be drawn upon for analysis and interpretation of the vehicle environment. The object size is a reliable attribute of a fusion object, the object size being used for a classification of detected objects. The object size can be passed on to vehicle guidance systems or driver assistance systems, and it considerably increases the degree of detail of a travel environment recorded by sensors.

Figure 15:
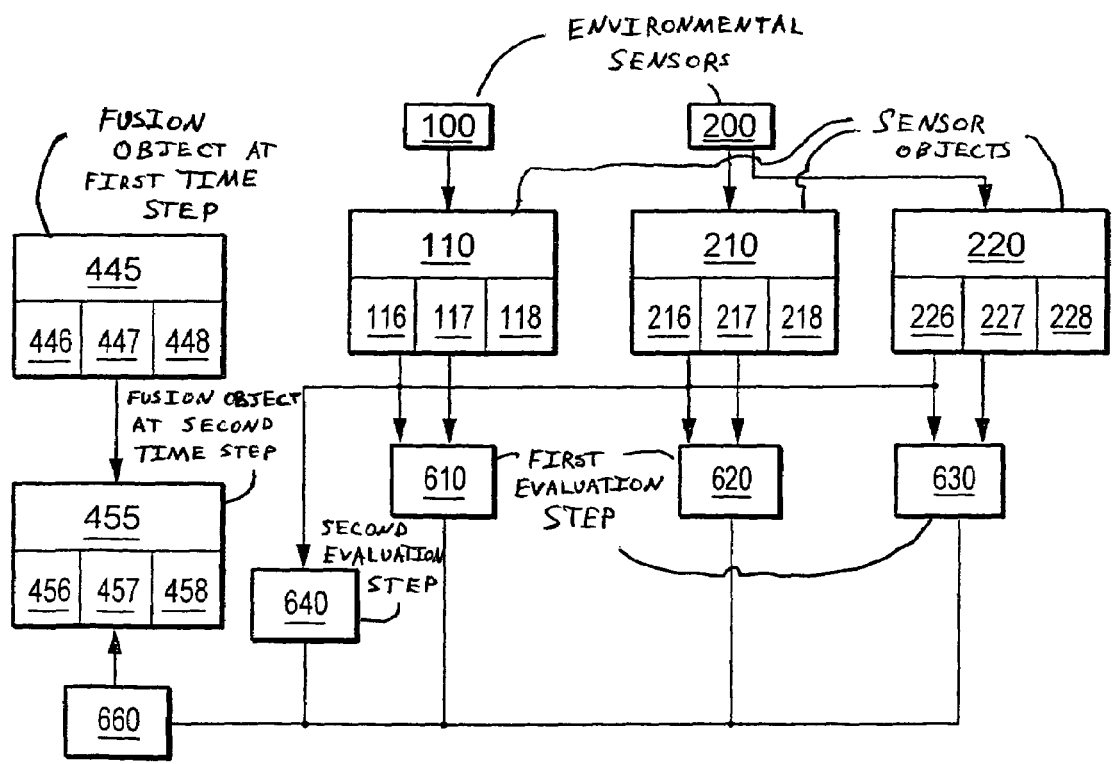
FIG. 15 shows a processing diagram for determining an object magnitude.

FIG. 15 shows an overall method, according to the present invention, for determining the object size. An example, shows the calculation of the width of an object. In FIG. 15, for example, the following situation is shown: First sensor 100 supplies first sensor object 110, and second sensor 200 supplies third sensor object 210 and fourth sensor object 220. This is shown in FIG. 15 by arrows, an arrow from the box marked 100 being shown going to the box marked 110, and in each case an arrow from the box marked 200 being shown going to the boxes marked 210 and 220. In the case of first sensor object 110, i.e. the box provided with reference numeral 110, three reference numerals 116, 117, 118 are shown in FIG. 15, which show in each case measured values of first sensor object 110. In this connection, for example, reference numeral 116 represents both the lateral deviation of the object represented by first sensor object 110, i.e. its extension in the y direction, and the quality of the ascertainment of the lateral deviation of the object represented by first sensor object 110. In this example, reference numeral 117 represents both the measured width of the object represented by first sensor object 110 and the quality of the ascertainment of the width of the object represented by first sensor object 110, whereas reference numeral 118 stands for additional measured values and attributes with regard to first sensor object 110 that are supplied by sensor 100. Correspondingly, in the case of third sensor object 210, i.e. the box provided with reference numeral 210, three reference numerals 216, 217, 218 are shown in FIG. 15, which show in each case measured values of third sensor object 210. In this connection, for example, reference numeral 216 represents both the lateral deviation of the object represented by third sensor object 210, i.e. its extension in the y direction, and the quality of the ascertainment of the lateral deviation of the object represented by third sensor object 210. In this example, reference numeral 217 represents both the measured width of the object represented by third sensor object 210 and the quality of the ascertainment of the width of the object represented by third sensor object 210, whereas reference numeral 218 stands for additional measured values and attributes with regard to third sensor object 210 that are supplied by second sensor 200. Correspondingly, in the case of fourth sensor object 220, i.e. the box provided with reference numeral 220, three reference numerals 226, 227, 228 are shown in FIG. 15, which show in each case measured values of fourth sensor object 220. In this connection, for example, reference numeral 226 represents both the lateral deviation of the object represented by fourth sensor object 220, i.e. its extension in the y direction, and the quality of the ascertainment of the lateral deviation of the object represented by fourth sensor object 220. In this example, reference numeral 227 represents both the measured width of the object represented by fourth sensor object 220 and the quality of the ascertainment of the width of the object represented by fourth sensor object 220, whereas reference numeral 228 stands for additional measured values and attributes with regard to fourth sensor object 220. that are supplied by second sensor 200. With regard to the data stored in sensor objects 110, 210, 220 it should be noted that, because of the fact that in some types of sensor no width information is available, in the sensor objects representing these sensors there are also not present any width data—or only inaccurate ones—at the corresponding places of the sensor objects.

Figure 16:
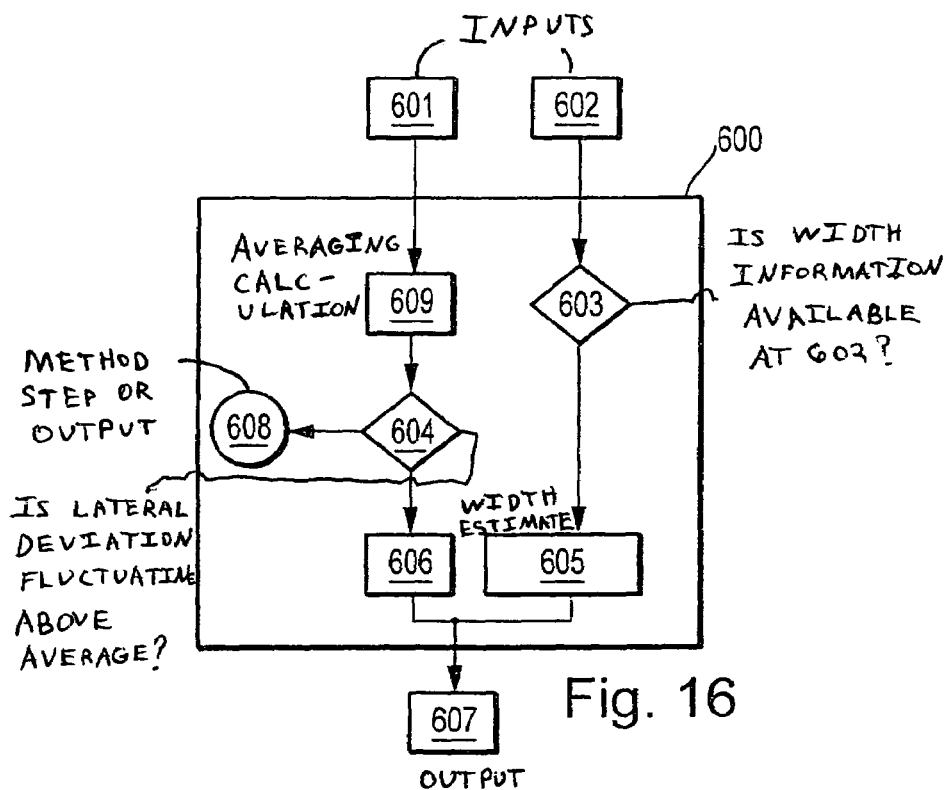
FIG. 16 shows a partial algorithm for determining an object magnitude.

In FIG. 15, an arrow points in each case from the data represented by reference numerals 116 and 117 to a box provided with reference numeral 610. Similarly, in FIG. 15, an arrow points in each case from the data represented by reference numerals 216 and 217 to a box provided with reference numeral 620. Similarly, in FIG. 15, an arrow points in each case from the data represented by reference numerals 226 and 227 to a box provided with reference numeral 630. Reference numerals 610, 620 and 630 stand in each case, in the identical way, for a first evaluation algorithm which evaluates the respective data of first, third and fourth sensor object 110, 210, 220. The first evaluation algorithm is shown in FIG. 16 as characterized by reference numeral 600, and it includes at least one first input 601 and a second input 602 as well as at least one first output 607. First input 601 in the "copy", designated by reference numeral 610, of first evaluation algorithm 600 is shown by the arrow between data 116 and box 610, and second input 602 in the "copy", designated by reference numeral 610, of first evaluation algorithm 600 is shown by the arrow between data 117 and box 610. In analogous fashion, 216 corresponds to first input of 620, and 217 corresponds to second input of 620, and 226 corresponds to first input of 630 and 227 corresponds to second input of 630. Furthermore, an additional arrow connects reference numerals 116, 216 and 226 collectively to a second evaluation algorithm, which is provided with reference numeral 640. The outputs of first evaluation algorithms 610, 620, 630 and of second evaluation algorithm 640 are connected to the input of a so-called coordinator that is furnished with reference numeral 660.

On the left side of FIG. 15a, a box is shown having reference numeral 445, which represents a fusion object—such as first fusion object 410—at a first time step. Fusion object 445 at first time step includes three reference numerals 446, 447, 448 similar to sensor objects 110, 210, 220, which each show measuring values of fusion object 445 at the first time step. In this connection, for example, reference numeral 446 represents both the lateral deviation of the object represented by fusion object 445 at the first time step, i.e. its extension in the y direction, and the quality of the ascertainment of the lateral deviation of the object represented by fusion object 445 at the first time step. In this example, reference numeral 447 represents both the measured width of the object represented by fusion object 445 at the first time step and the quality of the ascertainment of the width of the object represented by fusion object 445 at the first time step, whereas reference numeral 448 stands for additional measured values and attributes with regard to fusion object 445 at the first time step. On the left side of FIG. 15, a box is also shown having reference numeral 455, which represents fusion object 445 at a second time step. Fusion object 455 at the second time step includes three reference numerals 456, 457 458, which in each case represent measuring values of fusion object 455 at the second time step, similar to fusion object 445 at first time step. In this connection, for example, reference numeral 456 represents both the lateral deviation of the object represented by fusion object 455 at the second time step, i.e. its extension in the y direction, and the quality of the ascertainment of the lateral deviation of the object represented by fusion object 455 at the first second step. In this example, reference numeral 457 represents both the measured width of the object represented by fusion object 455 at the second time step and the quality of the ascertainment of the width of the object represented by fusion object 455 at the second time step, whereas reference numeral 458 stands for additional measured values and attributes with regard to fusion object 455 at the second time step. In the example shown in FIG. 15, it is assumed that sensor objects 110, 210, 220 are assigned to fusion objects 445 or 455, respectively, by the processing unit—such as in an association matrix—and that they represent an object 10, 20. It is the aim of the evaluation shown, for example, to ascertain the width of this object. Alternatively, of course, another extension could be ascertained.

The output of coordinator 660 is connected in FIG. 15 with an arrow to reference numeral 457, which is intended to express that, by the processing in first evaluation algorithms 610, 620, 630, the measuring value and the estimated value with respect to the width of the object represented by fusion objects 445 and 455 were updated and improved for second evaluation algorithm 640 and coordinator 660, from first time step (fusion object 445) to second time step (fusion object 455).

First evaluation algorithm 600, as shown in FIG. 16, is described in greater detail below. At first input 601, first evaluation algorithm 600 has available to it a value for the lateral deviation and a quality value for the lateral deviation. At the second input, first evaluation algorithm 600 has available to it—at least potentially—a value for the width and a quality value for the width. In a method step marked by reference numeral 603, a query is made as to whether width information is available at second input 602. If yes, the system branches to a method step furnished with reference numeral 605, which passes on the width and its quality information that is available at second input 602 as output variables of first evaluation algorithm 600 to output 607 of first evaluation algorithm 600. If width information is not available at second input 602, at step 603 the system branches to a method step provided with reference numeral 609, in which an average value of the lateral deviation is calculated from the history of the measured data on the lateral deviation (which are available at first input 601, starting from the corresponding sensor object or starting from the central memory of processing unit 400, in which the tracking data of the individual sensor objects are available). Information on the average value is subsequently passed on to a method step furnished with reference numeral 604, in which it is decided whether the lateral deviation is fluctuating about its average value. If this is the case, branching takes place to a further method step furnished with reference numeral 606, in which an estimate of the width of the respective object is generated from the fluctuations of the lateral deviation which is subsequently passed on to output 607 of first evaluation algorithm 600. If the lateral deviation does not fluctuate about its average value at step 604, first evaluation algorithm 600 is broken off either by an additional method step marked 608 shown in FIG. 16, or (as is not shown in FIG. 16) the value "zero" is passed on to output 607 as estimated or calculated width of the respective object, or the non-presence of a width is coded in the appropriate quality value.

Second evaluation algorithm 640, by a "min-max evaluation", generates at its output an estimated value for the overall width of the objects represented by sensor objects 110, 210, 220, from the data available to it, starting from the values and qualities for the lateral deviation marked with reference numerals 116, 216, 226.

Coordinator 660 generates width information from the width data and the quality data on the width data, which are supplied by first and second evaluation algorithms 610, 620, 630, 640, which—as shown in FIG. 15—is supplied to fusion object 455 at the second time step.

In summary, in order to determine the object size of objects by searching through the sensor objects arriving from the sensors or through the object lists for direct and indirect information concerning the extension of detected objects, the method attempts to supply an estimated value on the extension. One advantage of determining the size on the level of the fusion objects is that there is often redundancy in the incoming data. Size information can be gained from multiple measurements of one and the same object over several measuring cycles. A further advantage lies in the possibility of processing nonhomogeneous size data. By the combination of various methods it is possible to fuse both measured object extensions and variables gained from position measurements, i.e. to process them on the level of fusion objects. In order to ascertain the object variable, several object attributes are taken into consideration, such as the longitudinal distance, the lateral deviation, possibly the object width, the object height and the object length. One may differentiate between partial methods which construct object extensions from position data, such as first evaluation algorithm 600. The results of all the partial mathods are finally combined in coordinator 660.

In the method according to the present invention for determining object sizes, in particular the following method steps are carried out: Object size construction from a reflex observation over time: One may take advantage of the reflex drift of a radar sensor. This requires a stable detection of an object over a longer time period. The object plausibility is used for the evaluation of the stability and duration. Beginning at a threshold value of the object plausibility to be fixed, an object is sufficiently plausible to supply data concerning the width and length. From the measured minimum and maximum values of the distance and the lateral deviation, at least the standard deviations of the measuring errors are subtracted, so as to generate a statistically protected extension. Suitable reflex drifts appear, among other places, on wide curves or during swinging into or out of lanes on expressways. In order to avoid that two separate real objects are in error drawn upon for width production, sudden changes in the data are not acceptable. This partial method is used only in the case of sufficiently smooth measuring data.

Object size construction from a spatial reflex observation: The point shaped reflex centers of several single sensors may be processed. If a single real object is detected by several sensors at various reflection points, an extension may be constructed already after a few measuring cycles. From the minimum values and the maximum values the object width and object length are determined. The assignment of the sensor measurements to one and the same real object 10, 20 takes place in the association step in processing unit 400.

Object size construction from a spatial reflex observation: If several single sensors are used, which supply width and/or height and/or length data, in the processing step of merging, that is, during fusing of the individual objects, extended object widths, object heights and object lengths can be determined. The individual extensions are unified. The sizes thus created are consequently always larger than the individual extensions.

Object size construction by combined methods:

If a point measurement (e.g. by radar sensors) is assigned to an already existing, tracked fusion object provided with size information (e.g. by video sensors), then if the plausibility is sufficient, the size can be extended, perhaps by making plausible measurements at the edge and outside of what was the object edge up to now.

One of the aspects of the present invention relates to strategies for weighting object data at the production and updating of fusion objects. The weighting of individual sensor data within the fusion objects is supposed to be carried out intelligently, according to the present invention. The data, supplied by various sensors and assigned by an association step to one and the same fusion object, (which in their totality represent a real object 10, 20) are merged or associated to a single data set of the fusion object. In this context, the aim is to achieve the greatest possible accuracy in the data of the fusion objects. The single sensors have different detection properties, conditional upon different measuring principles. Added to this, there possibly are manufacturing tolerances. The method according to the present invention especially uses additional information on the quality of the data supplied by the method. The main advantage in the intelligent weighting of various sensor data lies in the best possible utilization of the information concerning the accuracy of the individual data. If, for a single real object, there are several data sets, a redundant data quantity is created. By taking advantage of this redundancy, a greater accuracy in the fusion data can be achieved as compared to the individual accuracies. The input data may be made up of sensor measuring data or of already existing and tracked fusion objects or of a mixture of the two. Thus there is an additional advantage of the method according to the present invention lies in the possibility of fusing fusion objects and single sensor objects in any desired composition.

For the concrete implementation of the method according to the present invention for weighting object data, it is assumed that there exists a quality measure for each item of object data. This quality measure can be determined statistically or it can be dynamically supplied along with each measurement. A main step in the processing of the sensor data is the data association whereby the data present are assigned to the fusion objects. The weighting is done by using the quality measure of the single sensors. The worse the quality of a piece of data, the smaller is its weighting. If a number n of data $a_1, \ldots, a_n$ is present for fusion, the fusion piece of data is calculated by:

a=sum of $w_i$ * $a_i$ over subscript i from i=1 to i=n, where $w_1, \ldots, w_n$ are the weights having the properties:
$w_i$ is greater than, or equal to zero for all i, and the sum over all $w_i$ is equal to one.

All attributes having continuous values, such as separation distance, speed, acceleration, width, height, length, are object data and can be fused in this manner. By rounding to the nearest value, even attributes having discrete values (such as the number of tracking cycles, the plausibility) are able to be fused in weighted manner. Measuring errors of measured variables typically have a statistical distribution. The variances of such distributions may, for example, be used as measurements of accuracy. But other scalar quality measurements are possible as alternatives. However, with respect to an individual object attribute, a uniform definition of the quality measurement has to be used.

In one first variant, according of the method according to the present invention, that is especially efficient to implement, for weighting object data, the weights $w_i$ of the single sensors are used corresponding to the reciprocal values of the individual quality measurements in normalized form. For the case of two single data $a_1$ and $a_2$, having variances $\sigma_1 * \sigma_1$ und
$\sigma_2 * \sigma_2$ the weights are:

$$w_1 = \sigma_2/(\sigma_1 + \sigma_2)$$

and $$w_2 = \sigma_1/(\sigma_1 + \sigma_2)$$

In a second variant of the method according to the present invention for weighting object data, it is assumed that the variance of the distribution function of the measuring errors is used as the quality measurement. The weightings $w_i$ of the single sensors are selected in such a way that the variance of the fusion piece of data becomes a minimum. For this, a multidimensional, quadratic optimization problem is solved. The weightings are a function of the number and the values of the individual variances. They may be given in a closed formula. For the ease of two single data $a_1$ and $a_2$, having variances $\sigma_1 * \sigma_1$ and $\sigma_2 * \sigma_2$ the weights are:

$$w_1 = \sigma_2 * \sigma_2/(\sigma_1 * \sigma_1 + \sigma_2 * \sigma_2)$$

and $$w_2 = \sigma_1 * \sigma_1/(\sigma_1 * \sigma_1 + \sigma_2 * \sigma_2)$$

In comparison to that of the first variant, the calculating effort is only slightly larger. Within the meaning of the variance of the fusion piece of data, this procedure is the best possible way according to the second variant.

One of the aspects of the present invention relates to an optimized data management of a plausibility measurement for fusion objects. The plausibility describes how certainly and reliably an object is detected. It accompanies a fusion object during its entire life duration. In judging the relevance of an object for a certain application, the object plausibility makes an important difference. As an essential object attribute, particularly of a fusion object, the plausibility can be passed on to vehicle guidance systems or driver assistance systems. With that, the degree of detail of a travel environment recorded by sensors is enhanced. Classification and interpretation of a recorded travel environment benefit particularly from the quality measurement of the plausibility. In the method according to the present invention for the optimized data management of a plausibility measurement for fusion objects, in particular, the plausibility is applied as an attribute of an object, i.e. especially of a fusion object. In a certain sense, it contains the object history, and tells how certainly an object is detected. The incrementing and decrementing of the plausibility is a function of various influence variables.

Plausibility may be defined as a scalar measurement. If a fusion object is newly applied, the plausibility is set to zero, or to a value corresponding to the number of detecting sensors. If the fusion object continues to be detected, the plausibility is continually increased. Above a certain threshold value, an object is taken as being plausible. If there are some missing measurements, the plausibility is lowered appropriately. If the object is not detected over several cycles, because it is no longer there or has distanced itself from the recording range of all the single sensors applied, the plausibility is successively reduced. If it falls below a specified threshold value, the fusion object is taken to be no longer plausible. When the plausibility becomes sufficiently low, a fusion object is deleted.

Some essential mechanisms for plausibility identification are listed below:

Normalization of Plausibility

Plausibility can be normalized to the interval [0,1]. In this case a compact value range is determined. Consequently, using a suitable discretization, the required storage space can be determined independent of time. If a change in a plausibility value is calculated, which might result in leaving the interval [0,1], the changed value is limited by a limiter, downwards by zero and upwards by one. If, during the incrementing and decrementing calculated values are yielded which lie between the discretization steps, one may round up to the nearest discretization value.

Determination of the Base Increment

The base increment denotes the smallest unit of a plausibility change. This increment may be constant or variable. Various variants are possible:
  a constant value, perhaps 0.1, may be used as base increment.
  an exponential value may be selected as base increment. If perhaps the plausibility lies in the interval [0,1], only small changes occur in the vicinity of 0 and 1. At 0.5 the changes are the greatest. The values 0 and 1 are reached only asymptotically.

Determination of the Increments and Decrements

The increments and decrements of the plausibility measurement are determined as a function of the number and quality of the objects of the single sensors.
  the more sensors simultaneously detect a fusion object, the greater the increment is determined to be. The increment may be selected, for example, to be proportional to the number of individual objects.
  the better the sensor quality, the higher the base increment of a single sensor may be weighted. This weighting can be a function of the characterized sensor specimen and its detection range. Thereby the weighting is influenced by a priori knowledge.

Timing of the Plausibility Data Management

The plausibility is newly calculated at the pulse of the sensor data fusion. The cycles of the sensor data fusion may be of the same or different pulse length.
  for example, if a sensor supplies data only in every second fusion cycle, its plausibility weight may be doubled, in order to ensure balanced plausibility proportions among the sensors. By consideration of the plausibility proportions it may be achieved that various single sensors bring an object to the same plausibility value within the same time span.
  alternatively, the plausibilities of the single sensors may be weighted equally. In this case, one achieves the equal treatment of the sensors via the age of the data supplied by the sensors and the characteristic sensor cycle time. If, within one pulse of the sensor data fusion, i.e. within the time span in which the processing algorithm is repeated, based on the sensor cycle time, one object could be measured, but is actually not measured, a decrementing takes place, but otherwise it does not.

Hysteresis of the Plausibility

For applications a fusion object is taken to be plausible if its plausibility measurement lies above a specified threshold value. In order to increase the stability and the dominance of existing fusion objects, a hysteresis can be built into this threshold value. If the plausibility lies in the interval [0,1], then 0.3 might be such a threshold value. Using hysteresis, at growing plausibility this value may be set to 0.4, and at falling plausibility it may be set to 0.2.

Figure 17:
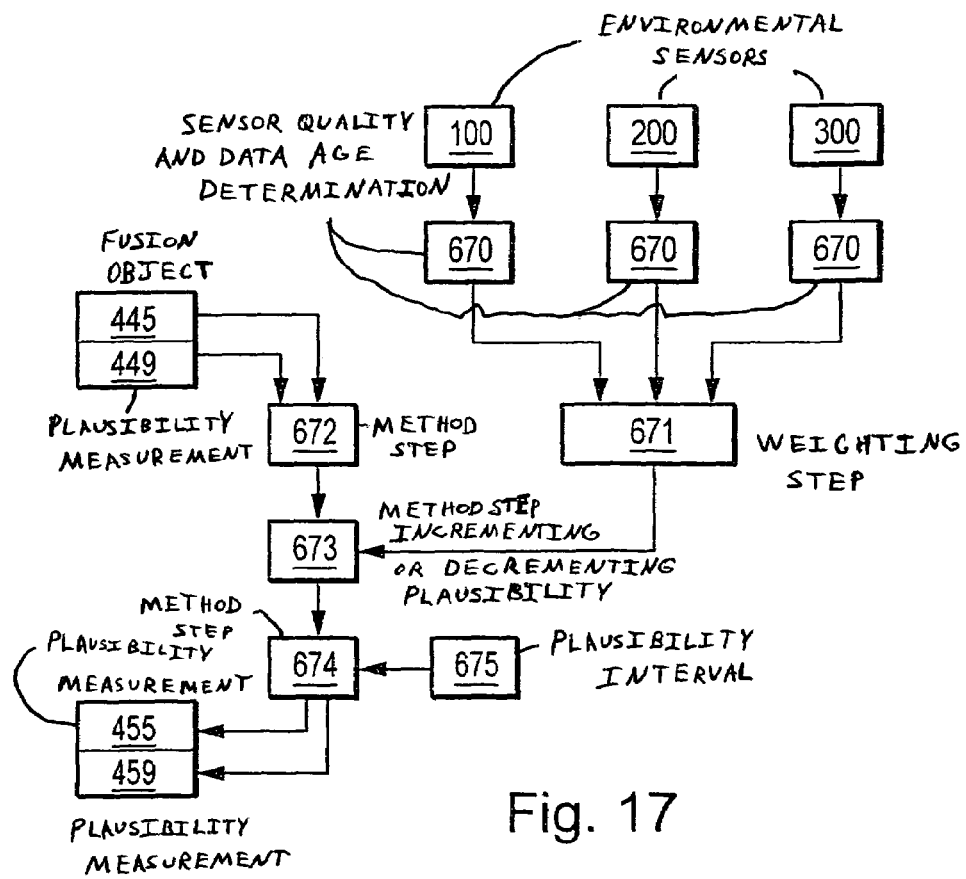
FIG. 17 shows a scheme for a plausibility administration.

FIG. 17 shows a scheme for a plausibility administration. Again, similarly to what was shown in FIG. 15, we are starting out from a fusion object 445 at a first time step. Such a fusion object includes as attribute a plausibility measurement which is characterized by reference numeral 449 for fusion object 445 at the first time step. In the example shown in FIG. 17, it is assumed that, during the association step, sensor objects supplied by sensors 100, 200, 300 were assigned to fusion object 445 at the first time step. The plausibility measurement for fusion object 445 at first time step is now to be updated for the second time step. This updating represents the fusion object 455 also shown in FIG. 17 at the second time step, which also includes a plausibility measurement that is characterized by reference numeral 459. Various method steps are carried out for updating the plausibility measurement. First of all, a method step is carried out marked by reference numeral 672, to which an arrow points in each case, starting from fusion object 445 at the first point in time and starting from plausibility measurement 449, and which calculates the base increment, starting from plausibility measurement 449. Next, starting from a method step characterized by reference numeral 672, a further method step denoted by reference numeral 673 is carried out. To show this, an arrow points from reference numeral 672 to reference numeral 673. In the method step denoted by reference numeral 673, the plausibility is incremented or decremented, namely as a function of data which are present, directly or indirectly, in the method step denoted by reference numeral 673, starting from sensors 100, 200, 300 that are also shown in FIG. 17. Starting from the method step denoted by reference numeral 673, in a further method step denoted by reference numeral 674, care is taken, as a function of a predefined plausibility interval denoted by reference numeral 675, that the limits of the plausibility interval are not exceeded by the proposed incrementing or decrementing, which is characterized in FIG. 17 by an arrow from reference numeral 673 and 675, respectively, to reference numeral 674. The value for the plausibility checked in the method step provided with reference numeral 674 is subsequently made available to fusion object 455 at the second time step, which is characterized in FIG. 17 by arrows from reference numeral 674 to fusion object 455 at the second time step and its plausibility attribute 459, respectively.

In the example shown in FIG. 17, it is assumed that sensors 100, 200, 300 each supply sensor objects which are associated with fusion objects 445, 455 at the first and at the second time step. According to the present invention, sensors 100, 200, 300 supply data which are processed in a method step provided with reference numeral 670 which is run through separately for all sensors but in a uniform manner, which is shown in FIG. 17 by an arrow respectively from each of the sensors 100, 200, 300 to reference numerals 670 present in a corresponding plurality. The processing in the method step denoted by reference numeral 670 includes especially the determination of the sensor quality and the determination of the data age. The data processed and edited in the method steps provided with reference numeral 670 and supplied by sensors 100, 200, 300 are made available to a method step characterized by reference numeral 671, which is shown in each case by an arrow pointing to reference numeral 671, starting from reference numerals 670 in FIG. 17. At the method step denoted by reference numeral 671, the sensor data originating with single sensors 100, 200, 300 are weighted, and the result is made available to the method step characterized by reference numeral 673, as was described above, and is shown in FIG. 17 by an arrow from reference numeral 671 to reference numeral 673.

One of the aspects of the present invention relates to a method for prioritizing fusion objects. In the case of a plurality of fusion objects to be administered, the task arises of carrying out an optimized selection of relevant fusion objects. The limitation of the number of fusion objects has essentially two causes: First, usually a fixed and limited storage range is provided for the fusion object list. Second, the passing on of the information from the fusion objects via bus system B, for instance, on a CAN bus of the vehicle, means a further effort which also has to lie within the limits of the available resources. In the case of the use of several single sensors, and giving consideration to all objects of the single sensors, the list of the fusion objects may be clearly longer than the lists of the single sensors. If the number of fusion objects is limited, a choice has to be made. Such a prioritization of fusion objects takes place in a manner specific to the application. In the method according to the present invention it is especially advantageous that a method or a system for the prioritization of fusion objects is used in which a concentration takes place on the sensor information relevant to a specified application. If exclusively relevant information is processed and passed on, on the one hand, this goes easy on the resources, and, on the other hand, raises the speed of the additional processing of the information. This is advantageous in highly dynamic situations or dangerous situations (e.g. if there is activity on the part of an automatic emergency braking function) in which the pulse rate of the sensor data fusion can then be increased. In such situations, reduced data fusion can be carried out only on the data of the important, i.e. prioritized objects. A selection is made from all potential fusion objects. The selection is made in such a way that the fusion object list always contains the most relevant objects.

The prioritization is implemented by an internal ranking, i.e. the setting up of a priority list. The ranking takes place via a priority measurement. Fusion objects are sorted and administered according to their relevance. The fusion objects having the highest priority are the most relevant and remain on the list of fusion objects. If new fusion objects are created, their priority measurements are compared to those of the fusion objects already in existence. If there are more potential fusion objects than places on the list, the least relevant objects are removed from the fusion object list, or rather are not taken up into the list in the first place.

Measurement for the Priority

According to the present invention, a scalar measure may be used to describe the priority. In order to achieve a sufficiently detailed quantification, one may use, to the greatest extent possible, a fine discretization of the priority measure. A standardization, for instance on the interval [0,1] is possible. However, one must then make certain that a saturation of the priority to the value 1 cannot be attained in practice. Otherwise one cannot set up a unique ranking.

Application-Dependent Selection of Influences on the Priority

Function-dependent information is drawn upon for calculating the priority measure. This information is made available by the application. Some possible data are the traffic lane and the travel route envelope of one's own vehicle, or the distance from or relative speed to a preceding vehicle in one's own or a neighboring lane. Depending on the application, even the vehicle's own speed can influence the relevance of objects. Additional, prioritization-relevant information might be the steering angle, the yaw rate or the wheel rotational speed.

Dynamic Determination of the Priority Measure by Event Evaluation

The priority is newly calculated at the pulse of the sensor data fusion. To determine the priority, information from the application is evaluated. It is possible to use fixed priority constants for events. For a priority measure standardized on the interval [0,1], such constants may lie in the per cent or per mil range. For each event that has occurred, the appropriate constant is added to the priority measure. The magnitude of the constant determines its importance. Several events may be superimposed. Events of an object are, for example, the residence of the object in its own lane, a large deceleration value of a vehicle entering the lane, or the use of the object as target object by a controller (e.g. an ACC controller).

What is claimed is

1. A method for processing sensor data into fusion data, comprising:
   causing at least one sensor to generate the sensor data;
   performing an association step in which one of the following is performed: (i) assigning the sensor data to existing fusion data found in a fusion element, and (ii) generating new fusion data in a fusion element from the sensor;
   performing a subsequent fusion step in which fusion data additional to that of the association step is formed from an algorithmically-determined combination of the fusion data existing at the end of the association step; and performing a merging step subsequent to the fusion step in which a first fusion piece of data produced from a fusion step is merged with a second fusion piece of data produced from a fusion step to generate a third fusion piece of data.

2. The method as recited in claim 1, further comprising:
in the subsequent fusion step, weighting the sensor data as a function of a quality measure of the sensor data.

3. The method as recited in claim 2, wherein:
for the weighting of the sensor data, one of a statistical standard deviation and a statistical variance thereof is used.

4. The method as recited in claim 1, wherein:
in the merging step, the merging is performed if a difference between the first fusion piece of data and the second fusion piece of data undershoots at least one threshold value.

5. The method as recited in claim 1, further comprising:
performing an evaluation step in which a plausibility measure is assigned to one of the first fusion piece of data and the second fusion piece of data.

6. The method as recited in claim 1, further comprising:
performing an evaluation step in which a priority measure is assigned to one of the first fusion piece of data and the second fusion piece of data.

7. The method as recited in claim 1, further comprising:
performing a processing step in which for one of the first fusion piece of data and the second fusion piece of data an object size attribute is calculated, the object size attribute representing a size of a detected object.

8. The method as recited in claim 1, further comprising:
performing a processing step in which, on the basis of at least one of the first fusion piece of data and the second fusion piece of data, at least one of the following is recognized:
that an object is moving out of a detection range of the at least one sensor into a detection gap,
that the object is present in a detection gap, and
that the object is moving out of a detection gap into a detection range of the at least one sensor.

9. A method for exchanging data between a first sensor and a processing unit and between a second sensor and the processing unit, comprising:
transmitting first sensor data and second sensor data to the processing unit;
causing the processing unit to transmit acknowledgment data to at least one of the first sensor and the second sensor, wherein:
the sensor data includes at least one of position data and speed data of an object relative to the first sensor and the second sensor, and
the acknowledgment data includes information proportions feedback data of at least one of: (1) the first sensor data, if it is available, and second sensor data if it is available; and (2) a fusion data computed by the processor from said first or second sensor data.

10. The method as recited in claim 9, wherein:
the first sensor data and second data sensor data includes sensor objects and time data.

11. The method as recited in claim 9, wherein:
the acknowledgment data is used for at least one of alertness control and a preconditioning of the first sensor, the second sensor, and a third sensor.

12. A device for processing sensor data to fusion data, comprising:
a plurality of sensors for generating sensor data; and
a processing unit for receiving the sensor data, the processing unit;
performing an association step in which one of the following is performed: (i) assigning the sensor data to existing fusion data found in a fusion element, and (ii) generating new fusion data in a fusion element from the sensor data,
performing a subsequent fusion step in which fusion data additional to that of the association step is formed from an algorithmically-determined combination of the fusion data existing at the end of the association step; and
performing a merging step subsequent to the fusion step in which a first fusion piece of data produced from a fusion step is merged with a second fusion piece of data produced from a fusion step to generate a third fusion piece of data.

13. The device as recited in claim 12, further comprising:
in the subsequent fusion step, weighting the sensor data according to a quality measure of the sensor data.

14. The device as recited in claim 12, further comprising:
assigning a plausibility measure to at least one of the first fusion piece of data and the second fusion piece of data.

* * * * *